(12) United States Patent
Hamada

(10) Patent No.: US 8,463,278 B2
(45) Date of Patent: Jun. 11, 2013

(54) COMMUNICATION APPARATUS AND COMMUNICATION METHOD

(75) Inventor: Yutaka Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 214 days.

(21) Appl. No.: 12/719,425

(22) Filed: Mar. 8, 2010

(65) Prior Publication Data

US 2010/0234036 A1  Sep. 16, 2010

(30) Foreign Application Priority Data

Mar. 11, 2009  (JP) .................................. 2009-57568

(51) Int. Cl.
*H04W 72/00* (2009.01)
*H04W 24/00* (2009.01)

(52) U.S. Cl.
USPC ...... 455/450; 455/453; 455/452.1; 455/456.1

(58) Field of Classification Search
USPC ........................................ 455/450, 453, 452.1
See application file for complete search history.

(56) References Cited

U.S. PATENT DOCUMENTS

| | | | | |
|---|---|---|---|---|
| 5,960,353 | A * | 9/1999 | Lee ................................ | 455/453 |
| 7,664,512 | B2 * | 2/2010 | Chung et al. ................ | 455/456.1 |
| 7,817,997 | B2 * | 10/2010 | Nylander et al. .......... | 455/422.1 |
| 2004/0063438 | A1 * | 4/2004 | Hsu et al. ................... | 455/452.1 |
| 2008/0084822 | A1 * | 4/2008 | Sagfors et al. ............... | 370/235 |
| 2009/0005053 | A1 * | 1/2009 | Agin et al. .................. | 455/450 |

FOREIGN PATENT DOCUMENTS

| JP | 2003-264562 | 9/2003 |
|---|---|---|
| JP | 2004-129051 | 4/2004 |
| JP | 2006-261897 | 9/2006 |
| JP | 2007-194732 | 8/2007 |

* cited by examiner

*Primary Examiner* — Kent Chang
*Assistant Examiner* — Ngan Pham Lu
(74) *Attorney, Agent, or Firm* — Myers Wolin, LLC

(57) ABSTRACT

A communication apparatus includes a detecting part which detects a bandwidth used by a first terminal equipment which performs radio communication, a communication speed measurement part which measures a communication speed of a second terminal equipment, a control part which generates a control signal controlling a communication of the second terminal equipment if a total bandwidth of a bandwidth detected by the detecting part and a bandwidth corresponding to a communication speed of the second terminal equipment measured by the communication speed measurement part is equal to or larger than a certain threshold value, and a restraint part which restrains communication of the second terminal equipment according to the control signal generated by the control part.

13 Claims, 16 Drawing Sheets

FIG. 6

| IP(sorce) | Port | IP(destination) | Port | Speed(kbps) |
|---|---|---|---|---|
| AA.BB.CC.DD | 2825 | EE.FF.GG.HH | 21 | 0 |
| AA.BB.CC.DD | 2830 | EE.FF.GG.HH | 20 | 100 |
| EE.FF.GG.HH | 21 | AA.BB.CC.DD | 2825 | 1 |
| EE.FF.GG.HH | 20 | AA.BB.CC.DD | 2830 | 2000 |

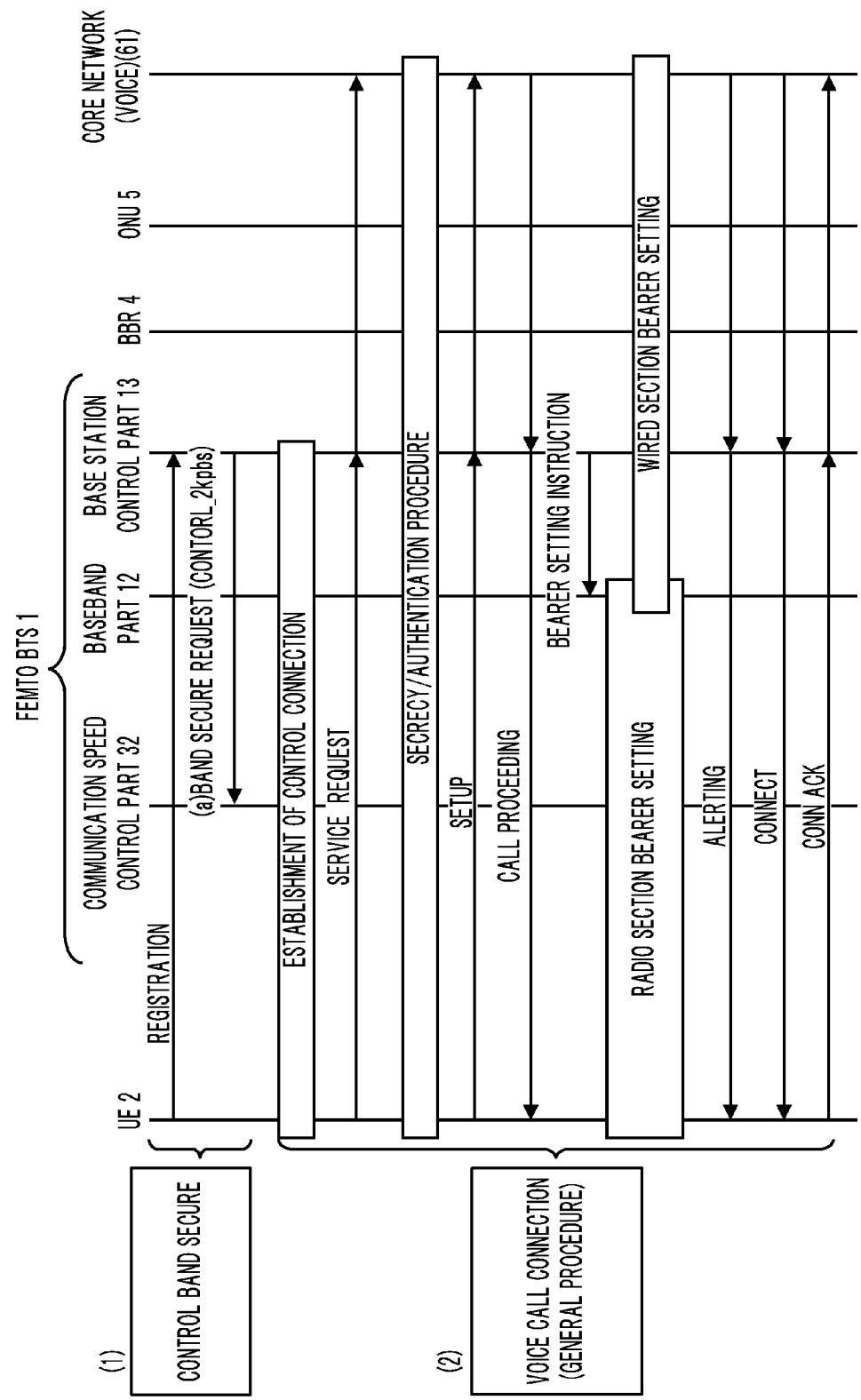

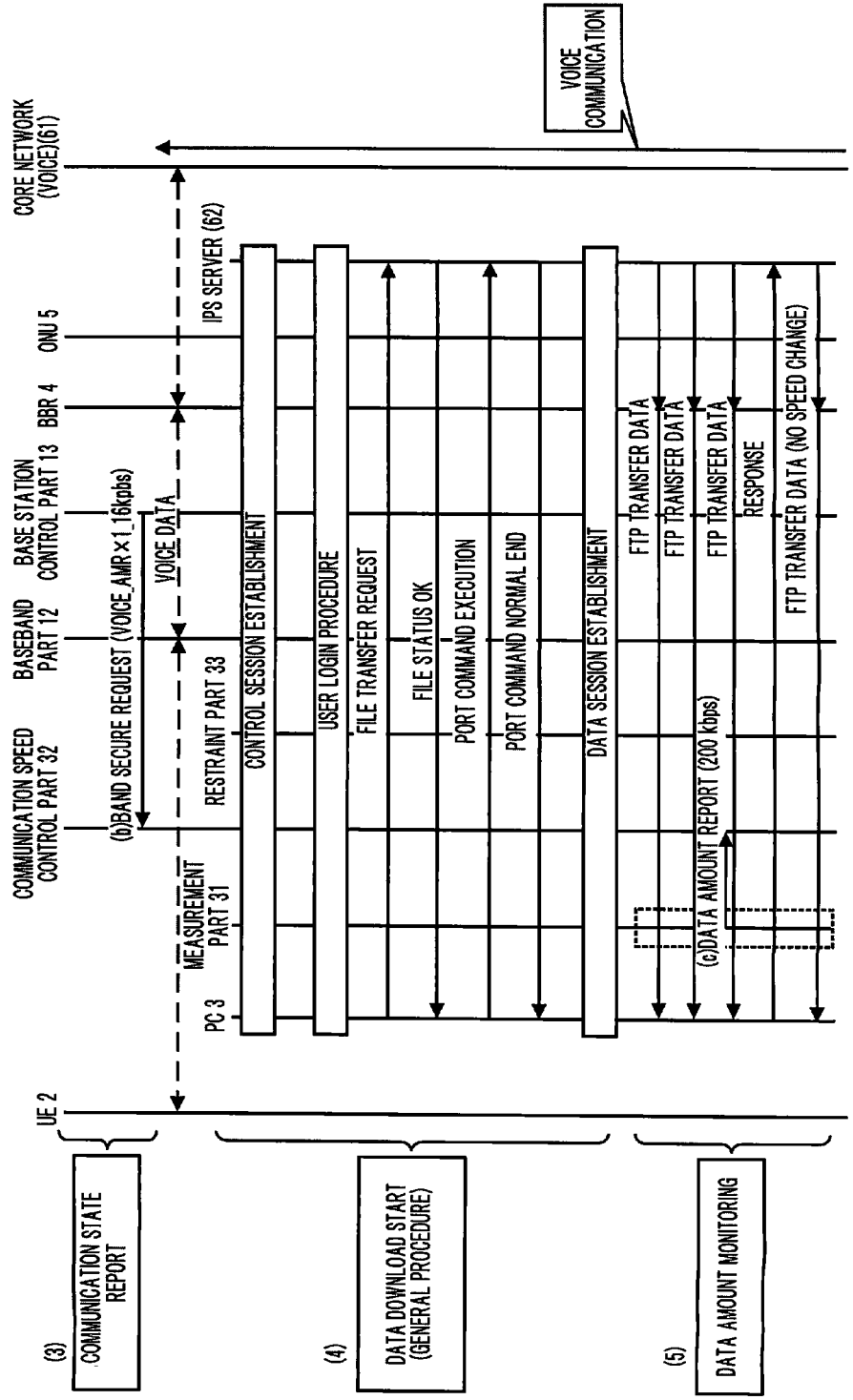

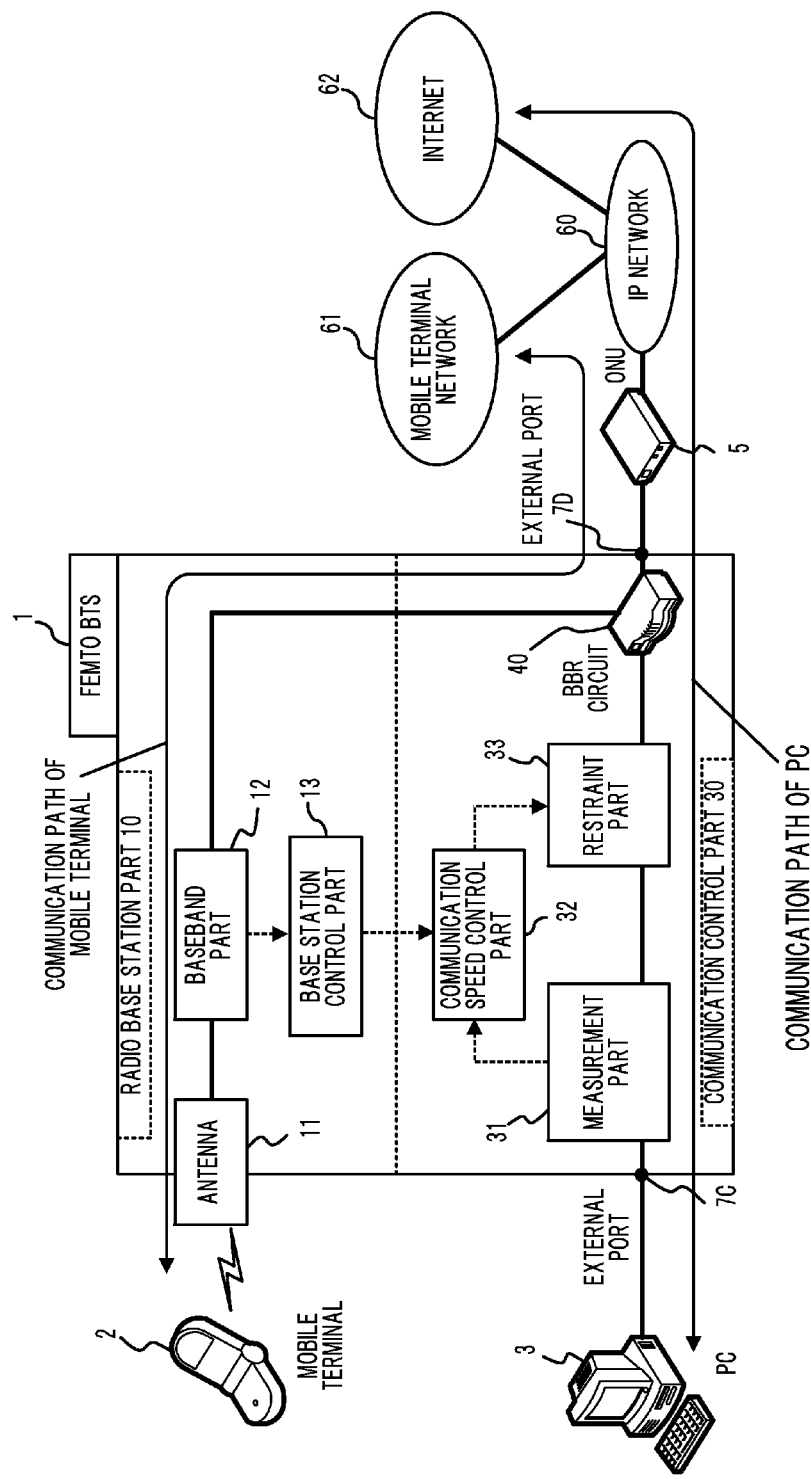

| | TRANSMISSION SOURCE ADDRESS | TRANSMISSION SOURCE PORT | RECEPTION DETERMINATION ADDRESS | RECEPTION DETERMINATION PORT |
|---|---|---|---|---|
| PC→BBR →INTERNET | 10.34.87.170 | 2732 | aa.bb.cc.dd | 25 |
| FEMTO BTS→BBR →MOBILE TERMINAL NETWORK | 10.34.87.171 | 1120 | ee.ff.gg.hh | 1121 |
| INTERNET →BBR→PC | aa.bb.cc.dd | 25 | ii.jj.kk.ll | AAA |
| MOBILE TERMINAL NETWORK →BBR→FEMTO BTS | ee.ff.gg.hh | 1121 | ii.jj.kk.ll | BBB |

BBR4 ⇒

(b)

| TRANSMISSION SOURCE ADDRESS | TRANSMISSION SOURCE PORT | RECEPTION DETERMINATION ADDRESS | RECEPTION DETERMINATION PORT |
|---|---|---|---|
| ii.jj.kk.ll | AAA | aa.bb.cc.dd | 25 |
| ii.jj.kk.ll | BBB | ee.ff.gg.hh | 1121 |
| aa.bb.cc.dd | 25 | 10.34.87.170 | 2732 |
| ee.ff.gg.hh | 1121 | 10.34.87.171 | 1120 |

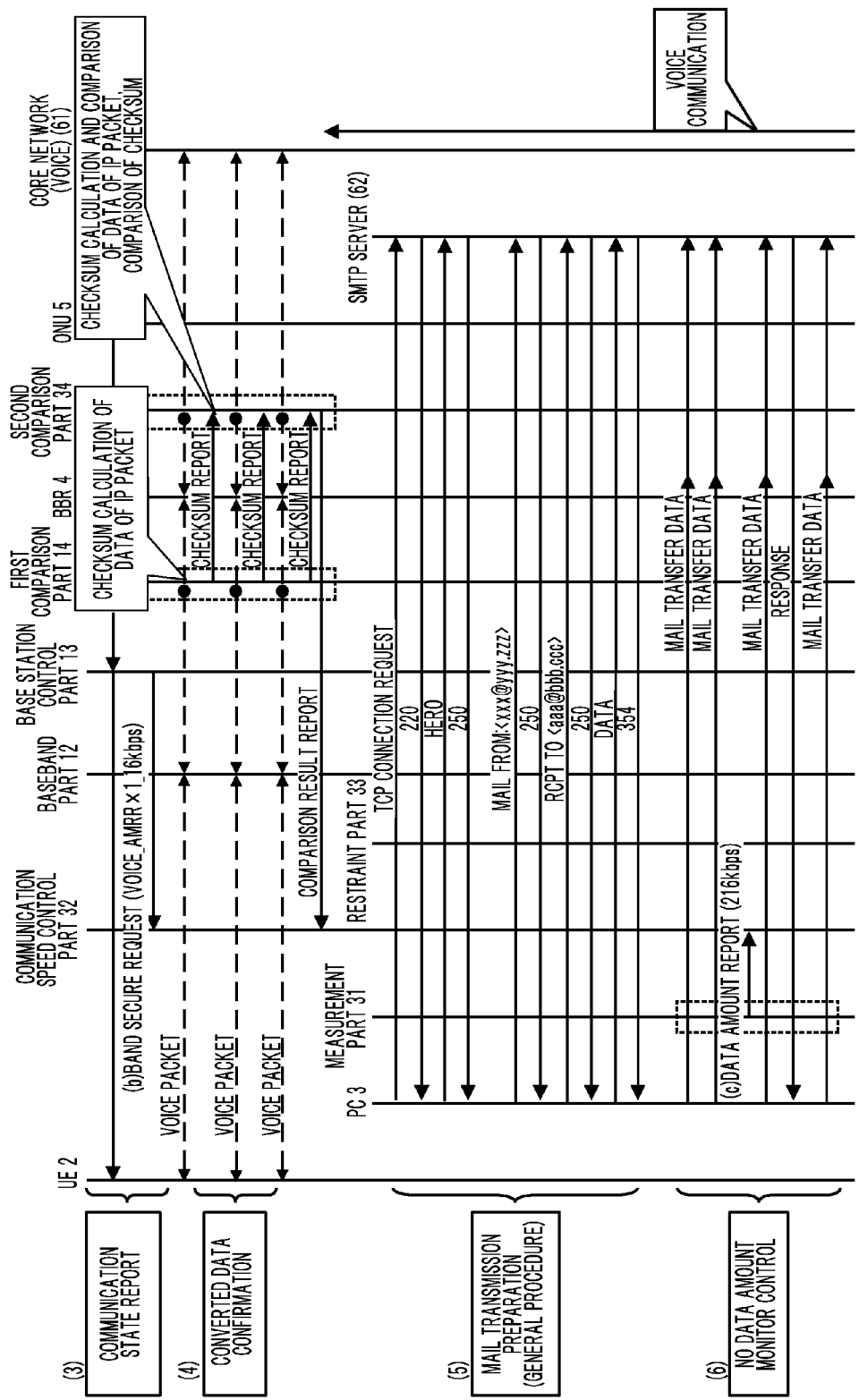

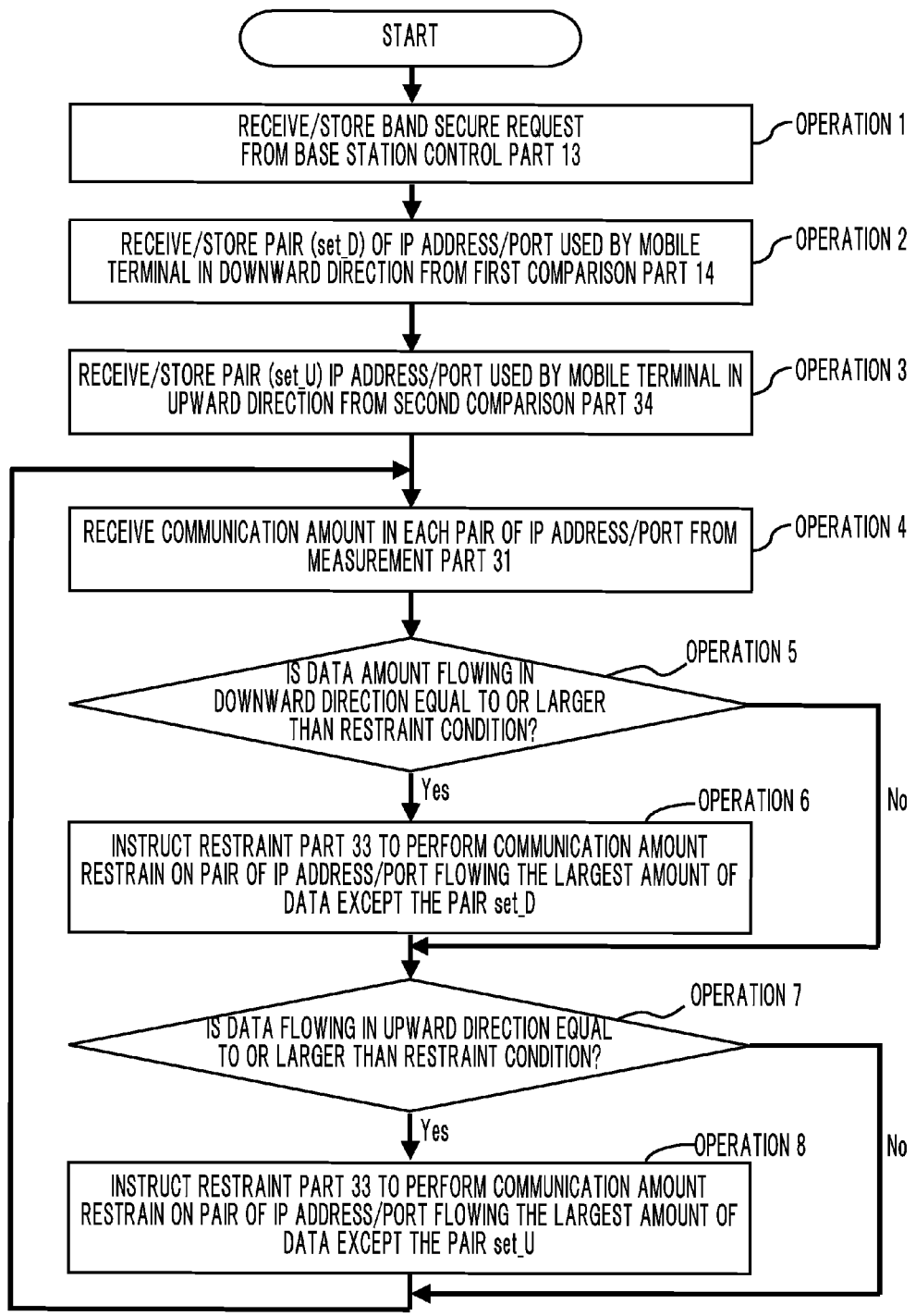

COMMUNICATION APPARATUS AND COMMUNICATION METHOD

CROSS-REFERENCE TO RELATED APPLICATIONS

This application is based upon and claims the benefit of priority of the prior Japanese Patent Application No. 2009-57568, filed on Mar. 11, 2009, the entire contents of which are incorporated herein by reference.

FIELD

The present invention relates to a communication apparatus that communicates with a plurality of terminal equipment. For example, the communication apparatus connects a plurality of terminal equipment including terminal equipment performing radio communication and a network.

BACKGROUND

A communication service performed by a mobile communication provides voice and data communication services to a plurality of users in an area of a radio base station. The radio base station has coverage of some kilometers. In recent years, as the number of mobile terminals has increased and the amount of data to be processed by each mobile terminal has increased, the number of mobile terminals in an area covered by a single radio base station has increased, resulting in an increase of the amount of communication data. As a result, there is pressure on the radio frequency bandwidth and the radio base station processing load is increased. This may cause quality loss of the communication service to be provided.

To solve the above-described problem, there is a mobile communication service using a super-compact base station, which is called "femto Base Transceiver Station (BTS)." According to the above-described mobile communication service, a mobile communication service is provided by connecting a super-compact radio base station (femto BTS) to a public Internet network or the like. A cell radius of a femto cell provided by the femto BTS is small, so that the number of users stored in a cell at one time may be decreased. Accordingly, a radio section between the mobile terminal and the femto BTS may have the same state as a special line. Thus, a hi-speed data communication, and a high-quality and low-cost voice communication are expected.

As a related art for maintaining the communication quality, a function for performing priority control of data is provided in, for example, a network apparatus such as a gateway, or communication equipment such as an optical network unit, a customer network terminating unit, an adapter installed inside a building, and the like. There are related arts for maintaining the communication quality of high priority data transfer by providing a priority to the data and controlling the communication according to the priority (see, for example, Japanese Laid-open Patent Publication No. 2003-264562, 2007-194732, 2006-261897, 2004-129051).

An Internet connection using a broadband line, for example, is required to use the femto BTS. As for the Internet connection service in Japan, the penetration rate of the broadband line exceeds 50 percent as of March, 2007. Communication terminals connected to these broadband lines are considered to be mainly personal computers at that time.

A femto cell is connected to a broadband line to have, for example, a building as coverage of the femto cell. This makes it possible to increase the data communication speed of a mobile terminal used inside the building and to reduce the load of a conventional base station installed outside.

For example, in a building having a connection to a broadband line, an optical network unit is allocated with respect to one line drawn from the outside. A communication terminal such as a personal computer (PC) is connected to the optical network unit. To connect a plurality of communication terminals, a broadband router (hereinafter referred to as BBR) may be connected to the optical network unit, and then a plurality of computers or various equipment may be connected.

To install a femto BTS inside a building, if the femto BTS is connected to the BBR that is already allocated or a new BBR is allocated, the above-described new mobile communication service may be provided.

As described above, when the femto BTS is allocated, the communication speed of the mobile terminal may be affected by the communication speed of other terminal equipment in the building because the usable communication speed is limited according to the equipment in the building.

That is, for example, during high speed data communication performed by terminal equipment such as a PC, when a mobile terminal attempts to perform communication, the bandwidth required by the mobile terminal may not be secured, so that the communication may be restrained. Real-time communication such as voice communication or a TV telephone is restrained, which may be very stressful to a user.

The above-described problem may occur not only in the femto BTS but also in a communication apparatus that communicates with a plurality of terminal equipment including radio terminal equipment.

SUMMARY

According to an aspect of the invention, a communication apparatus includes a detecting part which detects a band used by a first terminal equipment which performs radio communication, a communication speed measurement part which measures a communication speed of a second terminal equipment, a control part which generates a control signal controlling a communication of the second terminal equipment based on a comparison of the detected bandwidth from the detecting part and the measured communication speed from the communication speed measurement part with a certain threshold value, and a restraint part which restrains communication of the second terminal equipment according to the control signal generated by the control part.

According to an aspect of the invention, a communication apparatus includes a communication speed measurement part which measures a communication speed of data on a communication path where both data of a first terminal equipment which performs radio communication and data of a second terminal equipment pass through, an identification part which identifies the data transmitted and received to and from the first terminal equipment or the data transmitted and received to and from the second terminal equipment, a control part which generates a control signal which controls communication of the second terminal equipment by using an identification result from the identification part based upon the communication speed measured by the communication speed measurement part, and a restraint part which restrains the communication of the second terminal equipment according to the control signal generated by the control part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 is a diagram illustrating a configuration example of data stored in a memory of a communication speed control part, FIG. 7A is a first diagram illustrating a procedure for monitoring communication of a PC 3 according to the first embodiment, FIG. 7B is a second diagram illustrating a procedure for monitoring the communication of the PC 3 according to the first embodiment, FIG. 8 is a system configuration diagram that includes a femto BTS integrating functions of the BBR, FIG. 10 is a diagram illustrating an example of IP address conversion by IP masquerading, FIG. 11B is a second diagram illustrating a procedure for monitoring the communication of the PC 3 according to the second embodiment, FIG. 12 is a flowchart illustrating a process in a communication speed control part.

DETAILED DESCRIPTION OF THE PREFERRED EMBODIMENTS

With reference to the figures, detailed description will be made of embodiments of the present invention.

Figure 1:
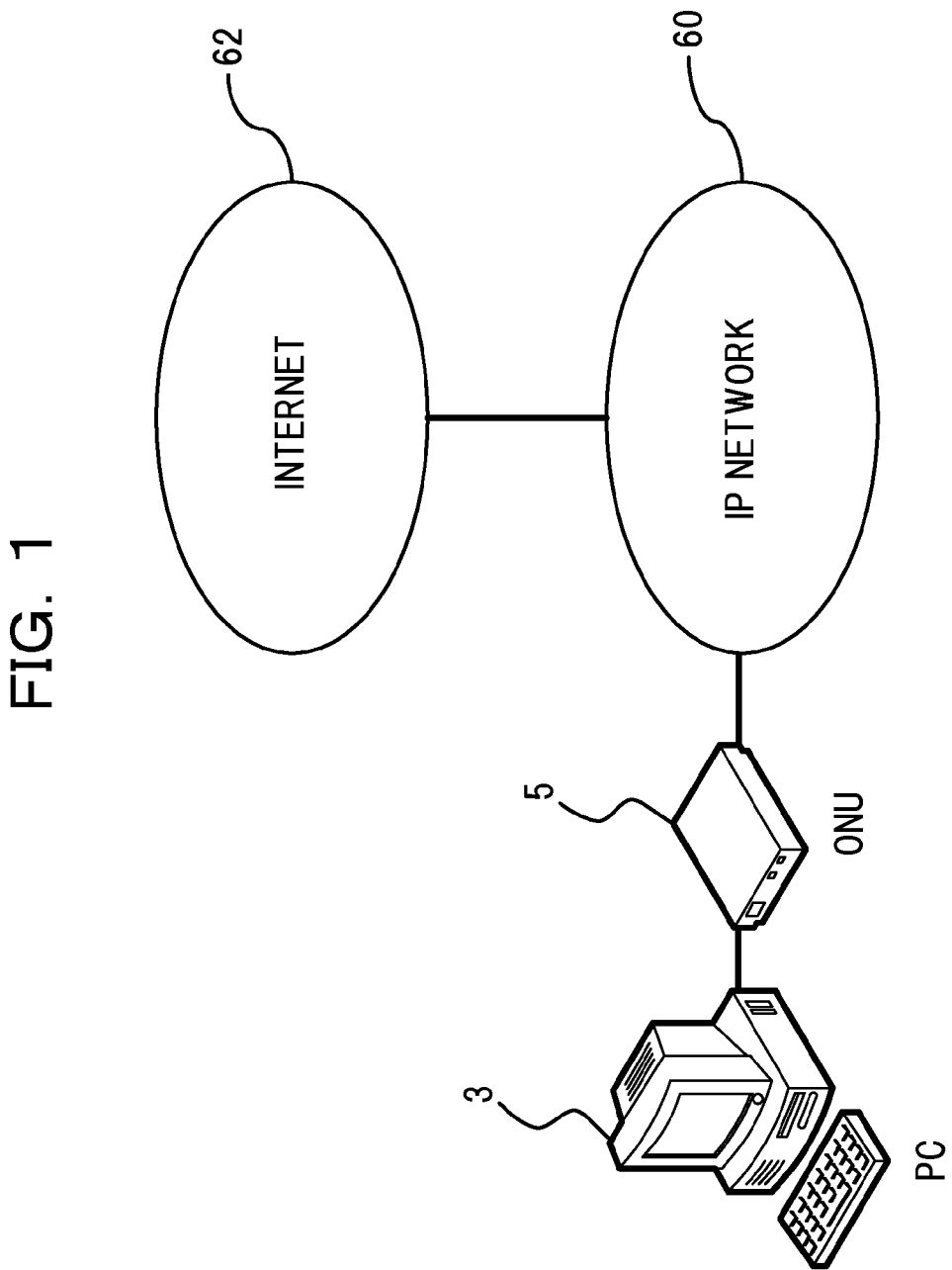
FIG. 1 is a diagram illustrating a system configuration example when a communication terminal is connected to the Internet by using a broadband line.

FIG. 1 is a diagram illustrating a system configuration example when a communication terminal is connected to the Internet by using a broadband line. FIG. 1 illustrates an example of a case where the communication terminal 3 such as a PC is connected to an Internet 62 via an Internet Protocol (IP) network 60 by using a service, for example, performed by Fiber To The Home (FTTH).

As illustrated in FIG. 1, in an Optical Network Unit (hereinafter referred to as ONU) 5 allocated inside a building, an optical line is connected to a communication terminal 3 such as a PC by performing conversion of a physical interface.

Figure 2:
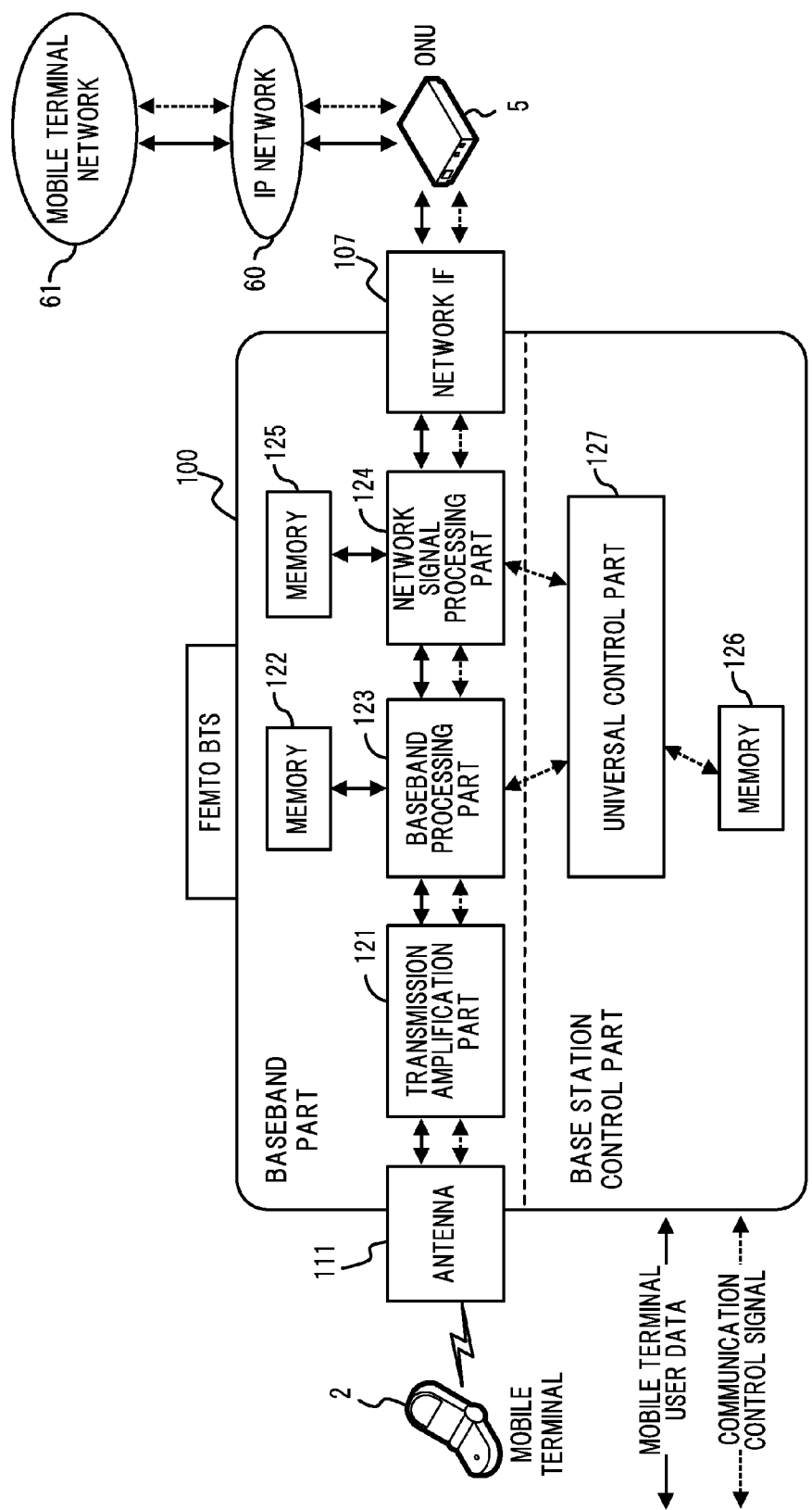
FIG. 2 is a diagram illustrating a system configuration example when a mobile terminal is connected to the Internet via a femto BTS.

FIG. 2 is a diagram illustrating a system configuration example when a mobile terminal is connected to a mobile terminal network 61 via a femto BTS. To allocate the femto BTS 100 inside the building, the femto BTS 100 is connected to the ONU 5 via the network interface 107. Inside the building, the mobile terminal 2 is connected to the mobile terminal network 61 via the femto BTS 100 to perform voice communication, or the like.

As illustrated in FIG. 2, the femto BTS 100 includes a baseband part and a base station control part. The baseband part performs baseband processing or the like on a signal received from the mobile terminal 2 and includes a transmission amplification part 121, a baseband processing part 123, a network signal processing part 124, and memories 122 and 125. The base station control part controls the femto BTS 100 and includes a universal control part 127 and a memory 126.

As for a signal received via a network interface (IF) 107, user data addressed to the mobile terminal 2 is separated from a control signal for communication by the network signal processing part 124. The baseband processing part 123 performs baseband processing on the user data input from the network signal processing part 124 or the control signal for communication input via the universal control part 127 of the base station control part.

The transmission amplification part 121 of the baseband part amplifies the signal to be transmitted to the mobile terminal 2 and transmits the signal to the mobile terminal 2 via an antenna 11. As described above, the universal control part 127 of the base station control part controls the femto BTS 100 according to the control signal input from the network signal processing part 124.

The femto BTS having the configuration illustrated in FIG. 2 may be added and allocated in the system configuration illustrated in FIG. 1, for example, in such a way that terminal equipment and various apparatuses are connected to the broadband router.

Figure 3:
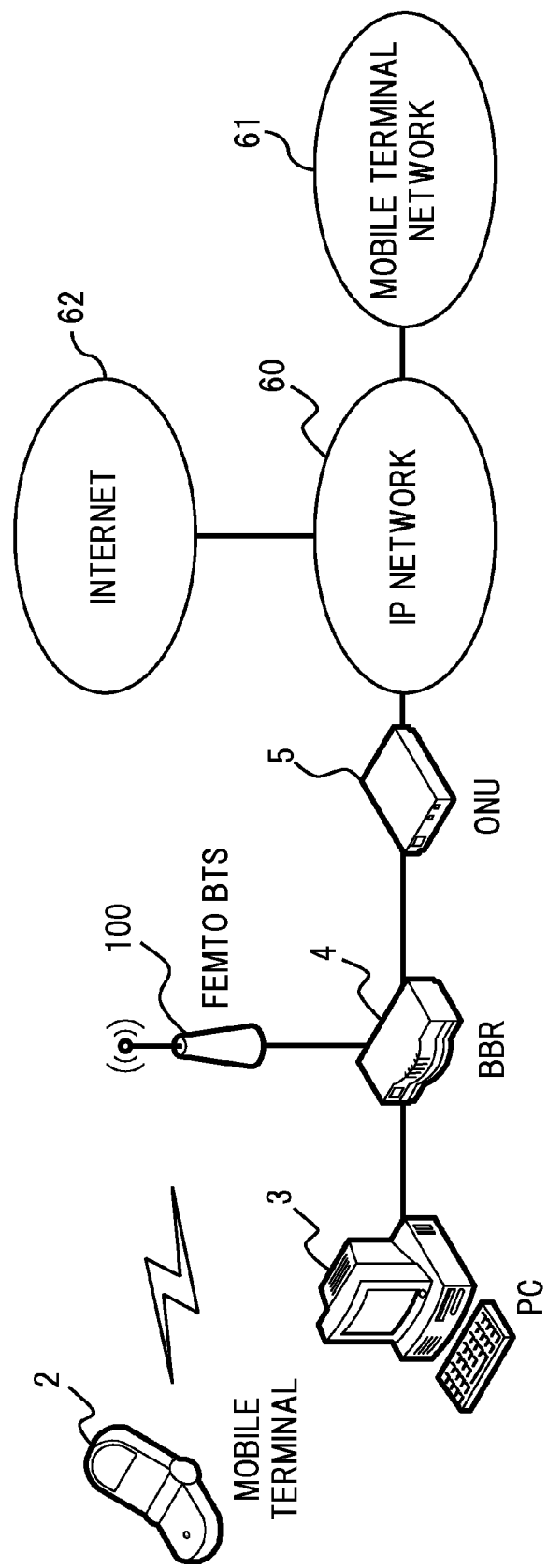
FIG. 3 is a diagram illustrating a system configuration example when a plurality of terminal equipment are connected to a broadband line via communication equipment in a building.

FIG. 3 is a diagram illustrating a system configuration example when a plurality of terminal equipment are connected to a broadband line via communication equipment inside a building. To connect the plurality of terminal equipment to the broadband line, a broadband router (BBR) 4 is provided beyond the ONU 5 to connect the femto BTS, the PC 3, and the like (other terminal equipment) to the BBR 4.

The PC 3 is connected to the Internet 62 via the BBR 4 and the ONU 5. The mobile terminal 2 is connected to the mobile terminal network 61 via the femto BTS 100, the BBR 4, and the ONU 5.

The communication between the PC 3 and an external network is performed regardless of a communication state of the femto BTS, that is, the mobile terminal 2. Therefore, in the system configuration illustrated in FIG. 3, when the PC 3 attempts to perform high-speed data communication, the real-time communication quality of the voice communication or the like of the mobile terminal 2 may be affected.

That is, the BBR 4 and equipment (the ONU 5 and the broadband line) beyond the BBR 4 are shared by the femto BTS 100 and a PC or the like as other terminal equipment such as the PC 3. If data transfer is performed by a PC at a high communication speed, the usable communication speed of the mobile terminal 2 stored in the femto cell may be decreased.

For example, the terminal equipment (the PC 3) that performs the data transfer at the high communication speed and the other terminal equipment (the mobile terminal 2) will be described as an example. In this example the shared parts and equipment between the PC 3 and the mobile terminal 2, have a maximum limit of usable communication speed of 500 kbps.

If the communication speed used by the PC 3 is 400 kbps and the communication speed used by the mobile terminal 2 is 64 kbps, the total communication speed is 464 kbps. Therefore, the communication is performed without problems in this case.

On the other hand, if the communication speed used by the PC 3 is 1000 kbps and the communication speed used by the mobile terminal 2 is 64 kbps, the total communication speed exceeds the maximum limit 500 kbps. Therefore, the communication may not be performed at 1064 kbps exceeding the maximum limit, and the communication is performed only at 500 kbps. If there is no specific means provided, the breakdown of 500 kbps at which the communication is performed is determined based on the ratio "1000:64" of the communication speed between the PC 3 and the mobile terminal 2. The communication is performed by the PC 3 at 500×1000/(1000+64)=470 kbps, and the communication is performed by the mobile terminal 2 at 500×64/(1000+64)=30 kbps.

A mobile terminal is used as a real-time two-way communication tool such as a voice communication and a TV telephone. To maintain the quality of the service provision, it is preferable to stabilize and secure the communication speed to be used. As illustrated in the above-described example, when the other equipment (the PC 3) performs data communication at high communication speed, in a state where the mobile terminal may perform the communication only at 30 kbps, various problems may occur if the mobile terminal 2 requires or requests a communication speed at 64 kbps, for example. That is, the voice data may be broken, or quality distortion of a television image may occur. This may be very stressful to a user.

When the communication service is provided to the terminal, a control signal is transmitted and received between the mobile terminal 2 and the mobile terminal network 61. The bandwidth used to transmit and receive the control signal is relatively small for a communication bandwidth. However, a service provision itself may not be performed if the bandwidth used to transmit and receive the control signal is not secured.

On the other hand, for e-mail transmission and reception or non-real-time communication such as Internet browsing, a stable communication speed may not be required as much as in the real-time communication.

When a plurality of terminal equipment are connected to a broadband line via the BBR inside a building to communicate with external equipment, it is preferable to secure the communication quality of the real-time communication service that is provided to the mobile terminal that communicates with the femto BTS connected to the BBR 4.

Description will be made of the femto BTS according to the present embodiment.

First Embodiment

Figure 4:
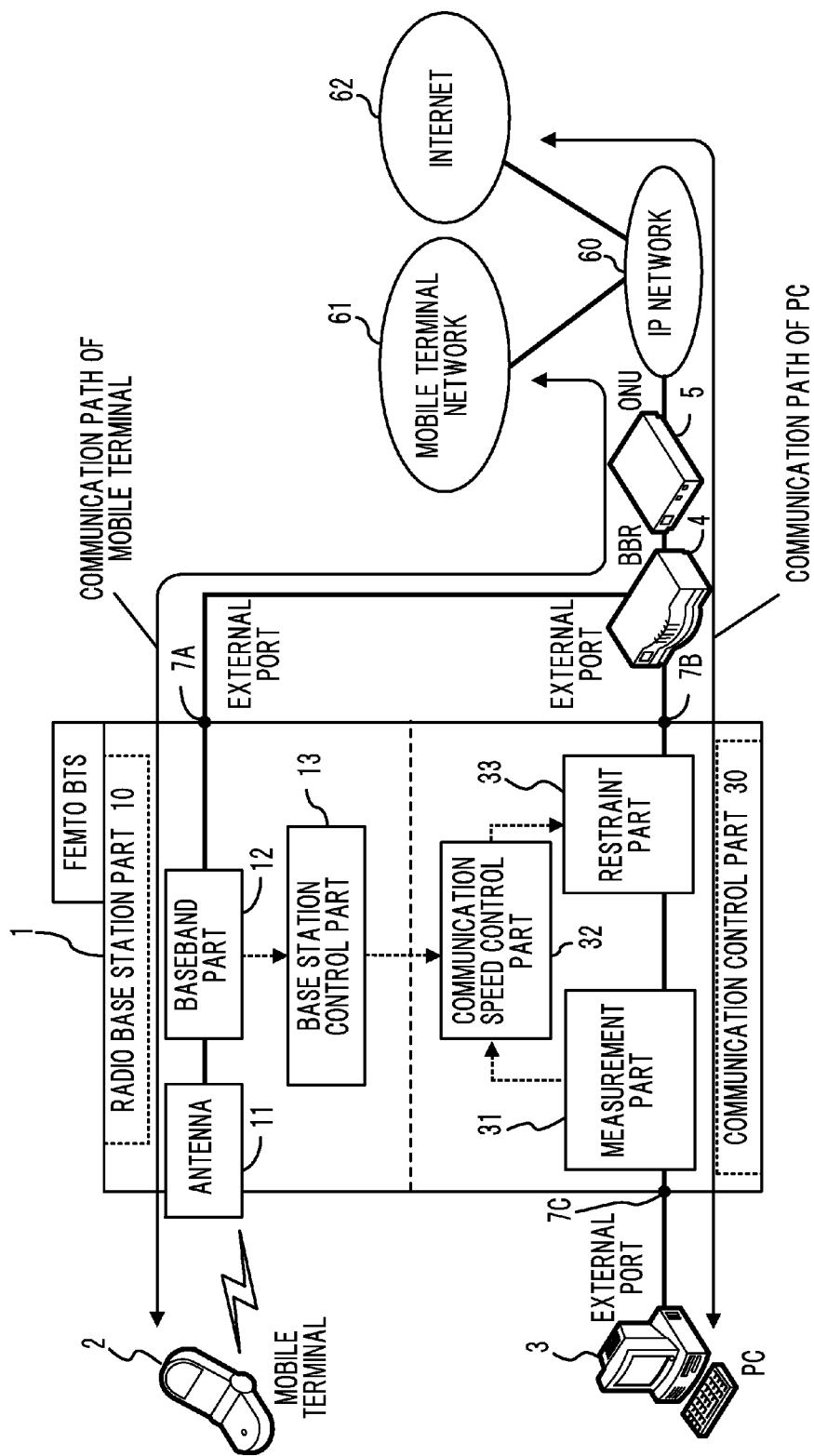
FIG. 4 is a system configuration diagram that includes a femto BTS according to a first embodiment.

FIG. 4 is a system configuration example that includes a femto BTS according to the first embodiment. As illustrated in FIG. 4, a femto BTS 1 communicates with the mobile terminal 2 and terminal equipment (the PC 3 in FIG. 4) other than the mobile terminal and is connected to the IP network 60 via the BBR 4 and the ONU 5. The mobile terminal 2 and the PC 3 are connected to the mobile terminal network 61 and the Internet 62 respectively via the IP network 60 to perform communication.

As illustrated in FIG. 4, the femto BTS 1 according to the present embodiment further includes a communication control part 30 in addition to the antenna 11 and the radio base station part 10. The femto BTS 1 is connected to another communication apparatus via a plurality of external ports 7 (for example, 7A to 7C).

The antenna 11 of the femto BTS 1 transmits and receives signals via the mobile terminal 2 and the radio section. The signal received from the mobile terminal 2 by the antenna 11 is input to the radio base station part 10.

The radio base station part 10 operates as a radio base station and includes a baseband part 12 and a base station control part 13. The radio base station part 10 is connected to one port of the BBR 4 via the external port 7A.

The external port 7A is used when the mobile terminal 2 performs communication via the femto BTS 1. The signal output from the external port 7A is input to the BBR 4 and is transmitted to the network via the BBR 4 or the ONU 5. The data received from the mobile terminal network 61 is input to the radio base station part 10 via the external port 7A, and the signal obtained by a required process is transmitted from the antenna 11.

In the radio base station part 10, the baseband part 12 performs signal processing such as baseband processing on various signals transmitted and received via the radio section between the radio base station part 10 and the mobile terminal 2. The base station control part 13 transmits and receives the control signal between the mobile terminal 2 and the mobile terminal network 61 to perform connection/disconnection of the line between the mobile terminal 2 and the femto BTS 1 and to perform connection/disconnection of the line and monitoring of the communication state between the femto BTS 1 and the mobile terminal network 61. At the same time, the base station control part 13 reports a communication state of the mobile terminal 2 to the communication control part 30.

The communication control part 30, which includes a measurement part 31, a communication speed control part 32, and a restraint part 33, monitors a communication amount of the other terminal equipment (the PC 3 in FIG. 4) other than the mobile terminal 2, and may control the communication of the other terminal equipment. The communication control part 30 is connected to one port of the BBR 4 via the external port 7B.

The external port 7B is used when the other terminal equipment, that is, the PC 3 performs communication via the femto BTS 1. The external port 7C is an input interface of data transmitted from the PC 3 and is an output interface of data transferred from the femto BTS 1 to the PC 3. In the femto BTS 1 illustrated in FIG. 4, the data transmitted and received between the PC 3 and the network flows between the external port 7C and the external port 7B.

In the communication control part 30, the measurement part 31 calculates the communication speed of the PC 3 by measuring the data amount transmitted and received to and from the PC 3 per part time. The communication speed control part 32 generates a control signal that controls the communication speed of the PC 3 and transmits the control signal to the restraint part 33 based on information reported from the base station control part 13 and the communication speed of the PC 3 reported from the measurement part 31. The restraint part 33 controls the communication of the PC 3 according to the control signal from the communication speed control part 32.

In the communication control part 30, the femto BTS 1 illustrated in FIG. 4 measures the communication speed of the data transmitted from the PC 3 and the data transferred to the PC 3. After that, the femto BTS 1 compares the sum of the bandwidth used by the mobile terminal 2 reported from the radio base station part 10 and the bandwidth corresponding to the communication speed measured by the measurement part 31 to a certain threshold value. As a result, if the obtained sum is larger than the certain threshold value, the communication of the PC 3 is restrained.

Figure 5:
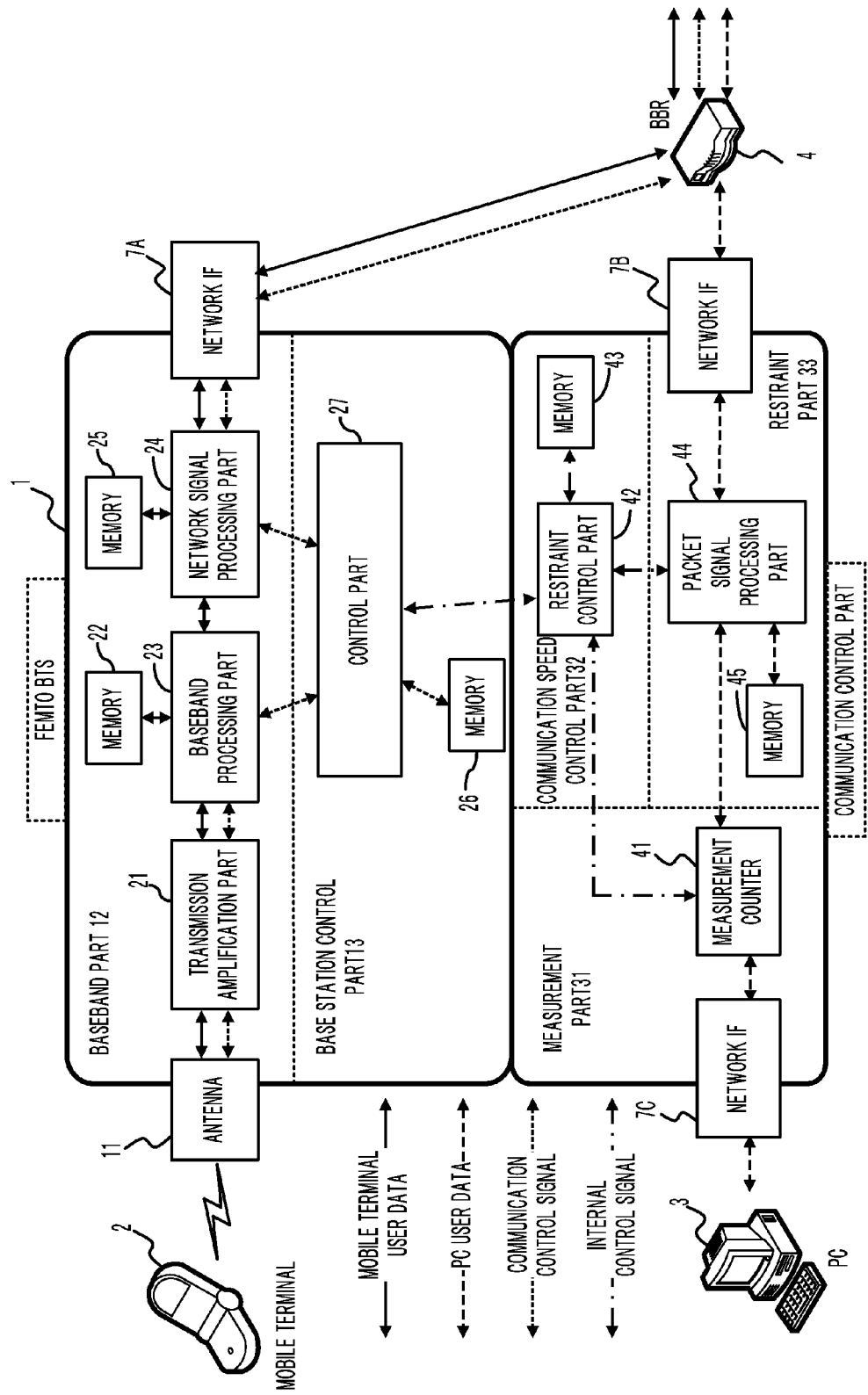
FIG. 5 is a block diagram of the femto BTS according to the first embodiment.

FIG. 5 is a block diagram of the femto BTS 1 according to the present embodiment. With reference to FIG. 5, detail description will be made of configurations and operations of parts of the above-described femto BTS 1. The network interfaces (IF) 7A to 7C illustrated in FIG. 5 correspond to the external ports 7A to 7C, respectively.

In the configuration of the femto BTS 1, the baseband part 12 of the radio base station part 10 includes a transmission amplification part 21, a baseband processing part 23, a network signal processing part 24, and memories 22 and 25. The base station control part 13 includes a control part 27 and a memory 26.

Among the input signals, the network signal processing part 24 gives a control signal used to control the communication of the mobile terminal 2 to the control part 27 and transmits the user data to the baseband processing part 23. The network signal processing part 24 performs required control processing according to an instruction from the control part 27. The information used for network signal processing is stored in the memory 25.

The baseband processing part 23 performs processing of the baseband signal. The information used for the baseband processing is stored in the memory 22. The transmission amplification part 21 amplifies a signal transmitted and received to and from the mobile terminal 2 via the antenna 11.

The control part 27 transmits and receives the control signal of the mobile terminal 2 between the network signal processing part 24 and the baseband processing part 23, and then performs various controls. The information used for the controls is stored in the memory 26. When the mobile terminal 2 is registered in the femto BTS 1, the control part 27 transmits the band information, used for communication of the control signal, to the communication speed control part 32 of the communication control part 30. The control part 27 detects a band used by the mobile terminal 2. That is, the mobile terminal 2 registered in the femto BTS 1 is connected to the mobile terminal network 61. To perform communication in which bandwidth securing is preferable to be performed, the control part 27 transmits the bandwidth information used for communication of the signal to the communication speed control part 32 of the communication control part 30.

In the communication control part 30, the measurement part 31 includes a measurement counter 41. The communication speed control part 32 includes a restraint control part 42 and a memory 43. The restraint part 33 includes a packet signal processing part 44 and a memory 45.

The measurement counter 41 measures the communication speed of the user data of the PC 3 flowing between the network interface 7C and the network interface 7B. The measurement counter 41 transmits the information of the measurement result to the restraint control part 42 of the communication speed control part 32.

Based on the information of the measurement result given from the measurement counter 41 of the measurement part 31 and the band information given from the control part 27 of the base station control part 13, the restraint control part 42 determines whether or not restraint of the communication of the PC 3 is required. If the restraint control part 42 determines that restraint of the communication of the PC 3 is required, the restraint control part 42 transmits a control signal that restrains the communication to the packet signal processing part 44 of the restraint part 33. The memory 43 stores the bandwidth information used by the mobile terminal 2 reported from the control part 27 and the information of the communication speed of the PC 3 measured by the measurement counter 41. Detailed description will be made below with reference to FIG. 6.

According to the control signal received from the restraint control part 42, the packet signal processing part 44 of the restraint part 33 controls the communication of the data flowing between the network interface 7C and the network interface 7B. That is, the packet signal processing part 44 controls the communication of the data transmitted and received to and from the PC 3. The memory 45 stores the information included in the control signal received from the restraint control part 42 and the information used to restrain the communication of the PC 3.

FIG. 6 is a diagram illustrating a configuration example of the data stored in the memory 43 of the communication speed control part 32. The memory 45 stores the bandwidth required by the mobile terminal 2 and the information of the communication speed of the PC 3 in each pair of an IP address and a TCP (Transmission Control Protocol)/UDP (User Datagram Protocol) port number of the data.

Based on the communication speed of each of the pairs of the IP address and the TCP/UDP port number stored in the memory 43 and the bandwidth required by the mobile terminal 2 reported from the radio base station part 10, the restraint control part 42 of the communication speed control part 32 determines whether or not restraint of the communication of the PC 3 is required. If the sum of the bandwidth required by the mobile terminal 2 and the bandwidth corresponding to the communication speed of the PC 3 is equal to or larger than a certain threshold value, the restraint control part 42 obtains the pair of the information used to restrain, that is, the IP address and the TCP/UDP port number from the memory 43. The restraint control part 42 reports the obtained pair of the IP address and the TCP/UDP port number to the restraint part 33 to restrain the communication.

The packet signal processing part 44 of the restraint part 33 determines that the packet in which the reported pair of the IP address and the TCP/UDP port number stored in the IP header and the TCP header of the packet is a target packet for the communication restraint, and then performs various communication restraint.

Figure 7C:
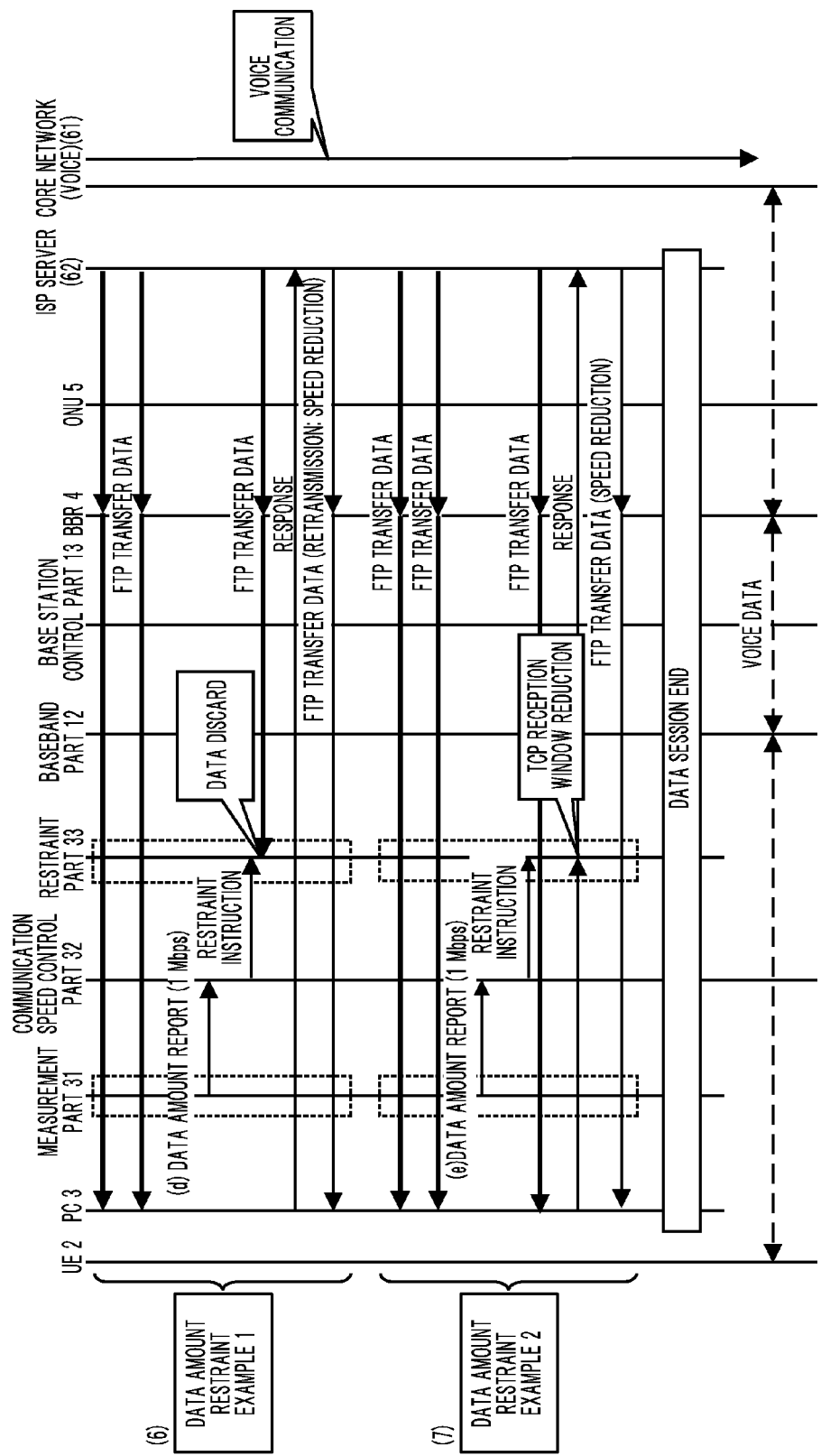
FIG. 7C is a third diagram illustrating a procedure for monitoring the communication of the PC 3 according to the first embodiment.

Next, detailed description will be made of a communication restraining method by the femto BTS 1 according to the present embodiment. FIG. 7A to FIG. 7C are diagrams illustrating procedures in which the femto BTS 1 according to the present embodiment monitors the communication of the PC 3 and performs required restraint to secure the communication bandwidth of the mobile terminal 2. For example, description will be made of a case where the PC 3 starts a non-real-time communication (File Transfer Protocol (FTP)) while the mobile terminal 2 is performing real-time communication (voice communication in this case).

In this case, the processing by which the mobile terminal 2 establishes call connection or the processing by which the PC 3 downloads the data are disclosed techniques, so that the detailed description is omitted. Determination whether if the terminal equipment stored in the femto BTS 1 is performing real-time communication or non real-time communication is made depending on whether if the TCP header or the UDP header is set to the packet transmitted and received to and from the terminal equipment. That is, when the UDP header is set to the packet transmitted and received to and from the mobile terminal 2 and when the TCP header is set to the packet transmitted and received to and from the PC 3, the femto BTS 1 starts monitoring of the communication of the PC 3 in the following procedure.

(1) If the femto BTS 1 detects that the mobile terminal (UE) 2 is stored in the femto cell, the femto BTS 1 receives a band secure request from the mobile terminal 2 to detect the bandwidth that is used by the mobile terminal 2 according to the received band secure request. The base station control part 13 performs band secure request with respect to the communication speed control part 32 based on the detected used bandwidth of the mobile terminal 2 (FIG. 7A (a)). In this case, the base station control part 13 requests for 2 kbps as a bandwidth for the control signal of the mobile terminal 2.

(2) The mobile terminal 2 establishes a control link between the mobile terminal 2 and the base station control part 13 of the femto BTS 1, and then performs connection of a voice call based on a regular transmission procedure of a mobile terminal. Then a voice communication path is established. The base station control part 13 determines a call type based on a Service Request message in the voice call connection processing, and then determines, according to a CONN ACK message, whether or not a voice communication path is established with respect to the mobile terminal 2. The base station control part 13 stores the communication service performed by the mobile terminal 2 as a real-time communication service and stores the communication speed to be used in a memory 26. When the communication control part 30 recognizes that the voice communication path is established with respect to the mobile terminal 2, the communication control part 30 constantly monitors the communication amount of the terminal other than the mobile terminal 2.

(3) If the voice communication is established, the base station control part 13 of the femto BTS 1 detects a used bandwidth of the mobile terminal 2 in the band secure requests received from the mobile terminal 2 and performs the band secure request on the communication speed control part 32 based on the detected used bandwidth of the mobile terminal 2 (FIG. 7B (b)). In this case, the base station control part 13 requests for 16 kbps where the voice communication by Adaptive Multi-Rate (AMR) is assumed to be performed.

(4) It is assumed that the PC 3 starts performing file transfer by FTP via the femto BTS 1 while the mobile terminal 2 is maintaining the voice communication. The PC 3 connected to the BBR 4 is connected to a specific server (ISP server) on the Internet 62 via a broadband line. The PC 3 downloads a certain file on the connected server. According to the connecting procedure of the FTP, the PC 3 logs into the server on the Internet 62 and starts the file transfer by the FTP.

(5) The measurement part 31 of the femto BTS 1 measures the data amount flowing between the external port 7B and the external port 7C and then obtains the communication speed of the PC 3. The measurement is performed for each direction in which the data flows and to each pair of the IP address and the TCP/UDP port number. The measurement part 31 reports the measurement result to the communication speed control part 32.

Based on the information of the bandwidth required by the mobile terminal 2 reported from the base station control part 13 in the above-described procedure (3) and the information of the communication speed of the PC 3 reported from the measurement part 31 in the above-described procedure (5), the communication speed control part 32 determines whether or not restraint of the communication of the PC 3 is required.

Specifically, if the sum of the bandwidth required by the mobile terminal 2 and the bandwidth corresponding to the communication speed of the PC 3 is equal to or larger than a given threshold value, the communication speed control part 32 determines that the communication of the PC 3 is required to be restrained. In the examples illustrated in FIG. 7A to FIG. 7C, the given threshold value is "1 Mbps". The given threshold value "1 Mbps" is a "restraint condition" in the following procedure.

As illustrated in (5) of FIG. 7B, if the communication speed of the PC 3 is 200 kbps (illustrated in FIG. 7B (c)), the sum of the bandwidth required by the mobile terminal 2 and 200 kbps is expressed as 16+200=216 kbps. The sum is smaller than the restraint condition. Therefore, the communication speed control part 32 does not restrain the communication.

After that, it is assumed that the communication speed of the PC 3 is increased from 200 kbps to 1 Mbps. FIG. 7C (6) and FIG. 7C (7) illustrate examples of the restraint of the communication of the PC 3 where the sum of the bandwidth (16 kbps) required by the mobile terminal 2 and the bandwidth corresponding to the communication speed of the PC 3 is equal to or larger than the restrain condition because the communication speed of the PC 3 is increased.

The communication speed of the PC 3 is 1 Mbps in the examples illustrated in the procedure (6) and the procedure (7). The sum of 1 Mbps (FIG. 7C (d) and FIG. 7C (e)) and the bandwidth (16 kbps) required by the mobile terminal 2 is expressed as 0.016+1=1.016 Mbps. The sum is larger than the restraint condition, 1 Mbps. In this case, the communication speed control part 32 of the femto BTS 1 transmits the control signal used to restrain the communication of the PC 3 to the restraint part 33. The restraint part 33 uses, for example, congestion control of TCP to perform the restraint described below.

(6) According to the restraint example 1, if the data amount flowing from the external port 7B to the external port 7C is large, some of the packets of the pair of the IP address and the TCP/UDP port whose flowing data amount is the largest among the data flowing in this direction are lost intentionally by the restraint part 33.

The packet that is lost by the restraint part 33 is retransmitted from a transmission source by a retransmission function of the TCP. Therefore, there is no influence on the data reception of the PC 3. However, the TCP session transits to a congestion mode because the data loss occurs. Thus, the transmission data amount from the IPS server is restrained. Accordingly, the data amount flowing from the external port 7B to the external port 7C in the femto BTS 1, that is, the data amount received by the PC 3 is restrained.

(7) According to a restraint example 2, as another example of the restraining method if the data amount flowing from the external port 7B to the external port 7C is large, the communication amount restraint control part 33 rewrites a reception window size in a response (ACK) transmitted from the PC 3 into a smaller value. Since the reception window size is rewritten into a smaller value, the data amount flowing from the external port 7B to the external port 7C of the femto BTS 1, that is, the data amount received by the PC 3 is restrained.

In addition to as illustrated in FIG. 7C (6) and FIG. 7C (7), by using a method for restraining the data amount flowing from the external port 7B to the external port 7C, the restraint part 33 intentionally may delay an ACK that is transmitted by the PC 3. After receiving the ACK from the PC 3, the ISP server transfers a next packet. Delaying the transfer timing of the ACK in the femto BTS 1, the data amount flowing from the external port 7B to the external port 7C, that is, the data amount transferred from the IPS server is restrained.

On the other hand, if the data amount flowing from the external port 7C to the external port 7B is large, the restraint part 33, for example, transmits a Pause packet of Institute of Electrical and Electronics Engineers (IEEE) 802.3x flow control specification to the external port 7C. If the restraint part 33 receives the Pause packet, the restraint part 33 restrains the transmission amount of the packet in the external port 7C. Accordingly, the data amount flowing from the external port 7C to the external port 7B, that is, the data amount transmitted by the PC 3 is restrained.

In the above-described description, one of the mobile terminals 2 and one of the PCs 3 are stored in the femto BTS 1, respectively. However, the present invention is not limited to this example. The above-described method may be used when a plurality of radio terminal equipment performing real-time communication such as voice communication or a TV telephone are stored or when a plurality of terminal equipment performing non-real-time communication such as data transfer are stored.

If a plurality of radio terminal equipment are stored in the femto BTS 1 and the plurality of radio terminal equipment perform real-time communication such as voice communication, the communication speed control part 32 obtains the total value of the bandwidth required by the base station control part 13. Then the communication speed control part 32 obtains the sum of the obtained total value and the bandwidth corresponding to the communication speed of the PC 3 or the like reported from the measurement part 31. If the obtained sum is equal to or larger than the restraint condition, the communication speed control part 32 restrains the PC 3 or the like.

When a plurality of terminal equipment other than radio terminal equipment are used and each of the equipment performs non-real-time communication, the communication speed control part 32 restrains the communication with the pair of the IP address and the TCP/UDP port number as a part reported from the measurement part 31. That is, if the sum of the bandwidth required by the radio terminal equipment and the measured total value of the communication speed is equal to or larger than the restraint condition, the communication speed control part 32 restrains the pairs of the IP address and the TCP/UDP port number in order from the pair with the higher communication speed until the restraint condition is met.

In the above-described example, as for the mobile terminal 2, the restraint condition is determined by the information of the bandwidth included in the band secure request, not by the actual communication speed. As for the mobile terminal 2 performing real-time communication, the bandwidth is secured to a maximum extent regardless of the actual communication speed.

According to the above-described embodiment, the BBR 4 and the ONU 5 are provided outside the femto BTS 1. The above-described equipment may be integrated with the femto BTS 1.

FIG. 8 is a system configuration diagram that includes the femto BTS 1 with which the function of the BBR 4 is integrated. The system configuration illustrated in FIG. 8 is different from that in illustrated in FIG. 4 in that the system configuration includes a broadband router circuit (BBR circuit) 40 in the femto BTS 1.

The BBR circuit 40 is mounted in the femto BTS 1 and is connected to the ONU 5 via the external port 7D. As with the BBR 4 illustrated in FIG. 4, the BBR circuit 40 illustrated in FIG. 8 is used to connect the terminal equipment to the broadband line. The BBR circuit 40 is connected to the baseband part 12 and the restraint part 33 and outputs the data transmitted and received to and from each of the mobile terminal 2 and the PC 3 to the external port 7D via the antenna 11 and the external port 7C.

In the femto BTS 1 illustrated in FIG. 8, as with the femto BTS having the configuration illustrated in FIG. 4, the communication control part 30 compares the sum of the required bandwidth received from the radio base station part 10 and the bandwidth corresponding to the measured communication speed of the PC 3 to the restraint condition. If the sum is equal to or larger than the restraint condition, the communication of the PC 3 is restrained by pair part by the same method as described above.

FIG. 8 illustrates a configuration of the femto BTS 1 that incorporates the function of a broadband router. As described above, the femto BTS 1 may further incorporate the function of the optical network unit (ONU) 5.

As described above, while the mobile terminal 2 is performing real-time communication such as voice communication via the femto BTS 1 set in a building, the femto BTS 1 according to the present embodiment monitors the communication speed of the other terminal equipment (the PC 3) performing non-real-time communication by using the communication equipment in the same building. If the communication speed of the other terminal equipment is high and the sum of the bandwidth required by the mobile terminal 2 or the like and the bandwidth corresponding to the communication speed of the other terminal device is equal to or larger than the given threshold value, the communication of the terminal device is restrained. The femto BTS 1 secures the communication speed of the mobile terminal 2 without affecting the communication quality of the other terminal equipment to restrain non-real-time communication of the other terminal equipment. This makes it possible to restrain the distortion of the communication quality of the mobile terminal 2.

Second Embodiment

Figure 9:
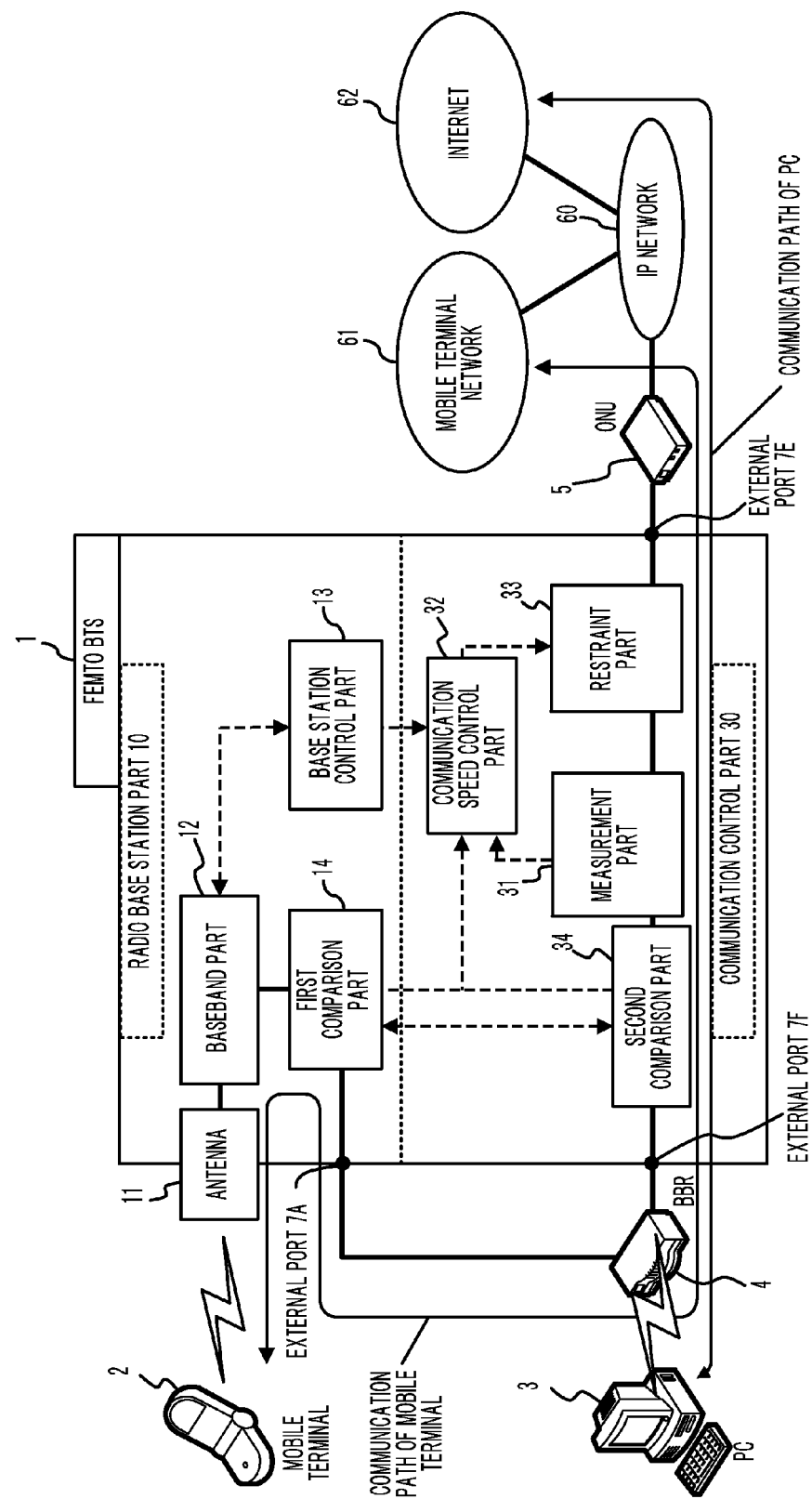
FIG. 9 is a system configuration diagram that includes a femto BTS according to a second embodiment.

FIG. 9 is a system configuration diagram that includes the femto BTS 1 according to a second embodiment. The femto BTS 1 according to the present embodiment is different from that in the above-described embodiment in that the femto BTS 1 is allocated between the broadband router (BBR) 4 and the optical network unit (ONU) 5. Description will be made below of a point different from the femto BTS according to the above-described first embodiment.

The femto BTS 1 illustrated in FIG. 9 includes external ports 7 (7A, 7E, and 7F). As with the external port 7A illustrated in FIG. 4, the radio base station part 10 is connected to one of the ports of the BBR 4 via the external port 7A. The external port 7A is used when the mobile terminal 2 performs communication via the femto BTS 1.

In recent years, a form that is integrated with a radio LAN access point is used for a BBR used inside a building. The above-described BBR performs direct communication with the PC 3 via a radio section. Therefore, as illustrated in FIG. 4, the femto BTS may not be allocated between the PC 3 and the BBR. As illustrated in FIG. 9, according to the present embodiment, the femto BTS 1 is allocated between a port for Wide Area Network (WAN) of the BBR 4 and the ONU 5.

To use the various functions that the BBR 4 has, it is preferable to have a configuration in which the BBR is interposed between the femto BTS 1 and the ONU 5. The femto BTS 1 according to the present embodiment has the configuration illustrated in FIG. 9. That is, the external port 7A of the femto BTS 1 is connected to one of the ports of the BBR 4. The BBR 4 is connected to the external port 7F of the femto BTS from another port.

FIG. 9 illustrates a case where the BBR 4 and the PC 3 perform radio communication. The configuration is not limited to this example. The BBR 4 and the PC 3 may be connected each other with a cable to perform wired communication.

The IP masquerading function is one of the functions that the BBR 4 has. The IP masquerading function is a technique that is used when a signal global IP address is shared by a plurality of IP apparatuses. The BBR 4 converts the local IP address that is allocated to the plurality of IP apparatuses connected to the BBR 4 into the global IP address that is used in the Internet. When the IP masquerading is used, the local IP address is converted into the global IP address by using the TCP/UDP port number.

FIG. 10 is a diagram illustrating an example of the IP address conversion by the IP masquerading. FIG. 10 (*a*) indicates the IP address and the TCP/UDP port number for the transmission source and the reception source before conversion. FIG. 10 (*b*) indicates the IP address and the TCP/UDP port number for the transmission source and the reception source after conversion.

The BBR 4 rewrites the local IP address and the TCP/UDP port number of the packet transmitted outside from the mobile terminal 2 and the PC 3 into the global IP address and the TCP/UDP port number that the BBR 4 has. The BBR 4 rewrites the global IP address and the TCP/UDP port number of the packet received from the network into the local IP address and the TCP/UDP port number that the mobile terminal 2 and the PC 3 have, respectively. The communication control part 30 measures and restrains the communication speed of the IP packet of the shaded IP address and TCP/UDP port number illustrated in FIG. 10 (*a*) and FIG. 10 (*b*).

As illustrated in FIG. 9, the IP packet transmitted from the mobile terminal 2 and the PC 3 and the IP packet, addressed to the mobile terminal 2 and the PC 3, pass along the same path of the communication control part 30 of the femto BTS 1. The communication control part 30 handles the shaded IP packets illustrated in FIG. 10 (*a*) and FIG. 10 (*b*). Therefore, the IP packet passing the communication control part 30 may not be identified as the IP packet transmitted and received to and from the mobile terminal 2 or the PC 3.

To identify if the IP packet passing the communication control part 30 is transmitted/received by the mobile terminal 2 or the PC3, the femto BTS according to the present embodiment includes a first comparison part 14 and a second comparison part 34.

The first comparison part 14 monitors the IP packet transmitted and received to and from the mobile terminal 2, that is, the IP packet flowing in the radio base station part 10, and then reports a monitoring result to the second comparison part 34. The second comparison part 34 monitors the IP packet flowing in the communication control part 30, that is, the IP packet transmitted and received to and from the mobile terminal 2 and the PC 3, and then reports a monitoring result to the first comparison part 14. Based on the information of the monitored IP packets and of the monitoring result received from the other comparison part, the first comparison part 14 and the second comparison part 34 identify the IP packet, transmitted and received to and from the mobile terminal 2, from the IP packet transmitted and received to and from the PC 3.

More specifically, the first comparison part 14 refers to the monitoring result (hereinafter referred to as monitoring information) of the second comparison part 34 reported from the second comparison part 34. As for the IP packet input to the first comparison part 14, the first comparison part 14 detects the IP packet corresponding to the reported monitoring result of the second comparison part 34 and reports the monitoring result to the communication speed control part 32. The IP address (that is, the IP packet transmitted from the mobile terminal 2) and the TCP/UDP port number detected by the first comparison part 14 and the monitoring information reported from the second comparison part 34 are reported to the communication speed control part 32.

The second comparison part 34 refers to the monitoring information of the first comparison part 14 reported from the first comparison part 14, detects the IP packet corresponding to the monitoring information from the data of the IP packet input by the second comparison part 34, and reports the IP packet to the communication speed control part 32. The IP address and the TCP/UDP port number of the detected IP packet (that is, IP packet received by the mobile terminal 2) and the monitoring information reported from the first comparison part 14 are reported to the communication speed control part 32.

The communication speed control part 32 compares the communication speed reported from the measurement part 31 to the restraint condition. The measurement part 31 measures the communication speed of the passing IP packet. That is, the measurement part 31 measures the communication speed not only of the PC 3 as a target of the communication restraint but also of the mobile terminal 2. According to the present embodiment, the communication speed control part 32 compares the communication speed (the data communication speed on the path between the external port 7F to the external port 7E) reported from the measurement part 31 to the restraint condition. A setting method of the restraint condition is the same as in the above-described embodiment. Based on the result compared to the restraint condition, if the communication speed of the data on the path between the external port 7F and the external port 7E is equal to or larger than the restraint condition, the communication speed control part 32 transmits a control signal to the restraint part 33 and then controls the restraint of the communication of the data transmitted and received to and from the PC 3.

The communication speed control part 32 uses the information reported from the first comparison part 14 and the second comparison part 34 to recognize the IP address and the TCP/UDP port number of the IP packet transmitted and received to and from the mobile terminal 2. The communication speed control part 32 excludes the IP packet transmitted and received to and from the mobile terminal 2, obtains the pair of the IP address and the TCP/UDP port number of the IP packet transmitted and received to and from the PC 3, and reports the pair to the restraint part 33. According to the report, the restraint part 33 performs various communication restraint.

Figure 11A:
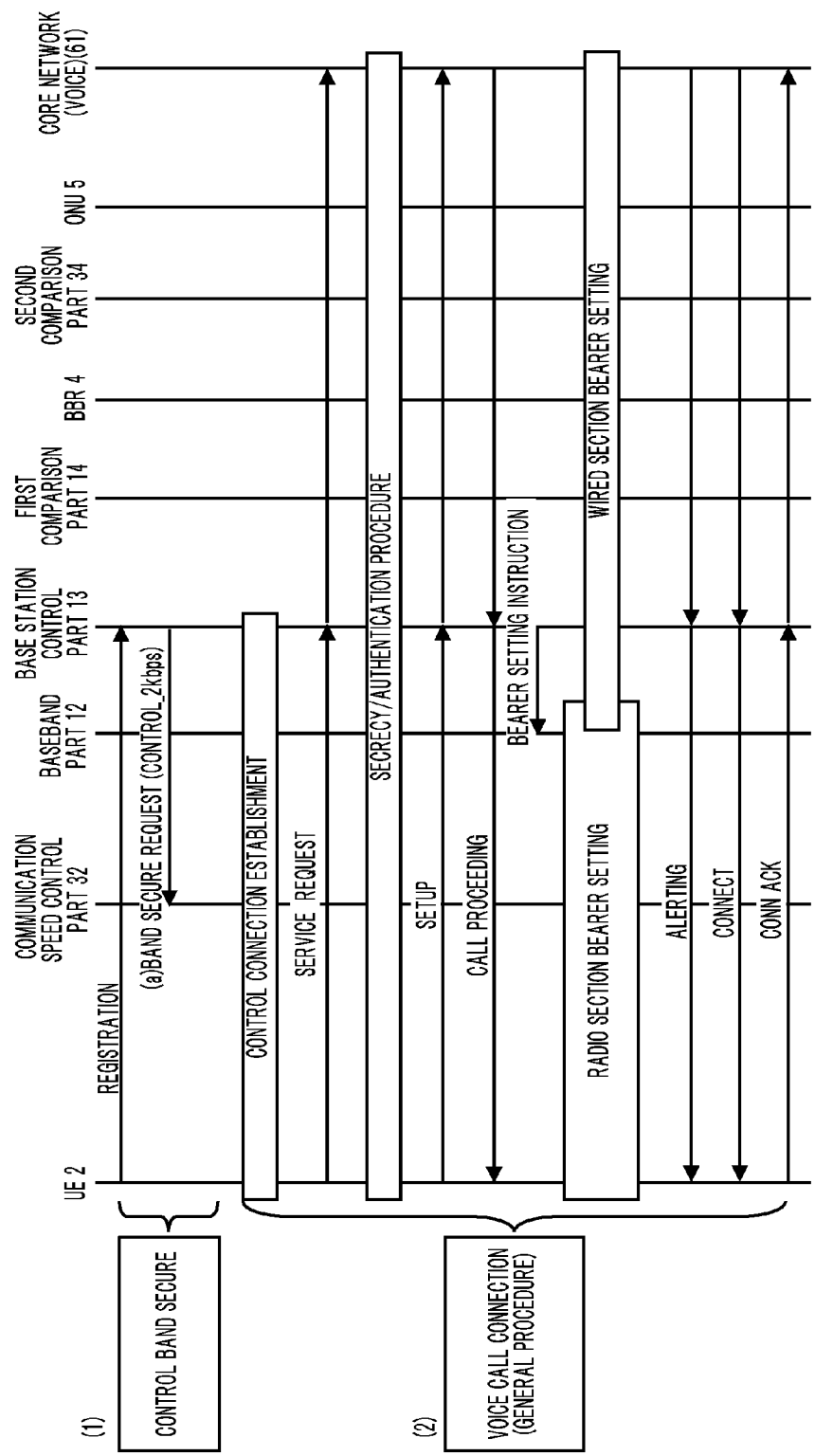
FIG. 11A is a first diagram illustrating a procedure for monitoring the communication of the PC 3 according to the second embodiment.
Figure 11C:
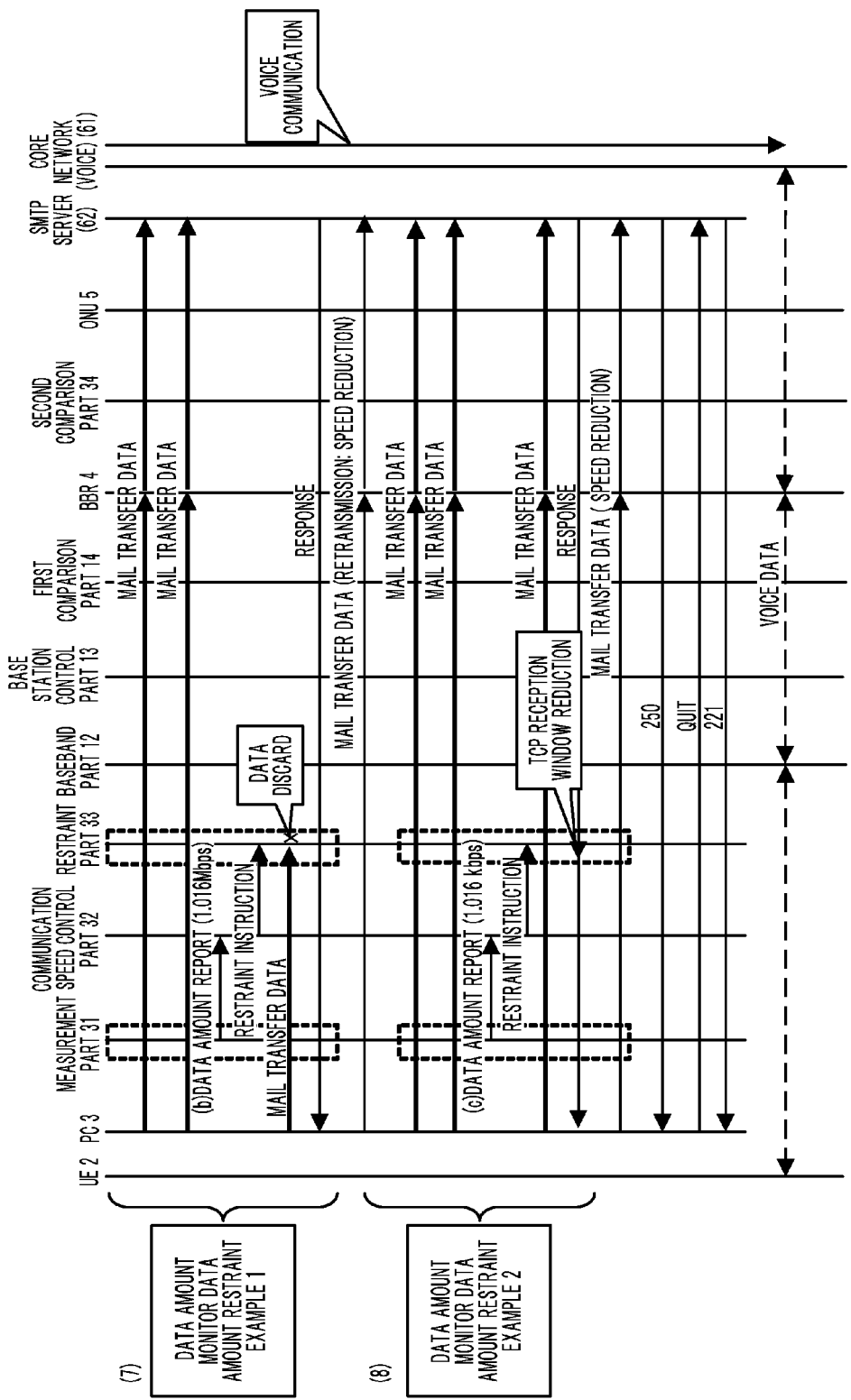
FIG. 11C is a third diagram illustrating a procedure for monitoring the communication of the PC 3 according to the second embodiment.

FIG. 11A, FIG. 11B, and FIG. 11C are diagrams illustrating procedures for monitoring the communication of the PC 3 and performing required restraint to secure the communication bandwidth of the mobile terminal 2. Here, description will be made of a case where the PC 3 starts non-real-time communication, for example, mail transfer by Simple Mail Transfer Protocol (SMTP) while the mobile terminal 2 is performing real-time communication (voice communication in this case). A disclosed technique may be used for the processing for establishing a call connection of the mobile terminal 2 and the processing to be performed by the PC 3 to transfer a mail, so that the detailed description is omitted.

As with the above-described embodiment, according to the present embodiment, the femto BTS 1 determines whether if the communication performed by the communication apparatus stored in the femto BTS 1 is real-time communication or non-real-time communication depending on a TCP header/UDP header.

Among the procedures illustrated in FIG. 11A to FIG. 11C, the procedures (1) to (3) are the same as the procedures (1) to (3) of FIG. 7A to FIG. 7C, respectively. The femto BTS 1 secures the bandwidth for the control signal of the mobile terminal 2 according to registration of the mobile terminal (UE) 2 and performs connection processing of a voice call. If the mobile terminal 2 recognizes that the voice communication path is established, the base station control part 13 of the femto BTS 1 stores, in the memory, the communication service performed by the mobile terminal 2 as real-time communication and the used communication speed. After that, the communication control part 30 illustrated in FIG. 9 constantly monitors the communication amount of the terminal other than the mobile terminal 2. The communication speed control part 32 control the memory to store the bandwidth (FIG. 11A (a) and FIG. 11 (*b*)) required by the base station control part 13.

(4) The first comparison part 14 and the second comparison part 34 calculate a checksum of the passing IP packet and transmits the checksum to the opposite comparison part (the second comparison part 34 and the first comparison part 14, respectively). The first comparison part 14 and the second comparison part 34 calculate the checksum of data except the IP/TCP/UDP header and transmits the calculated checksum to the opposite comparison part in correspondence to the pair of the IP address of the IP packet and TCP/UDP port number. The first comparison part 14 and the second comparison part 34 use the information received from the opposite comparison part and the calculated checksum to identify the IP packet transmitted and received to and from the mobile terminal 2 and the IP packet transmitted and received to and from the PC 3, and then report the result to the communication speed control part 32.

Description will be made of a method for identifying the packet transmitted from the mobile terminal 2 among the IP packets transmitted to the network. As for the IP packet flowing toward the BBR 4 from the radio base station part 10, the first comparison part 14 calculates the checksum of the data except the IP/TCP/UDP header and gives the calculation result to the second comparison part 34. As described above, the checksum transmitted to the second comparison part 34 is associated with the pair of the IP address of the packet and the TCP/UDP port number.

The second comparison part 34 calculates the checksum of the IP packet flowing toward the external port 7E from the external port 7F (that is, the BBR 4 side). As with the first comparison part 14, the second comparison part 34 calculates the data except the IP/TCP/UDP header from the IP packet.

The second comparison part 34 compares the calculated checksum to the checksum received from the first comparison part 14. As for the checksum of the IP packet among the IP packets as a target of the checksum calculation in the second comparison part 34, the checksum received from the first comparison part 14 and the value match each other. The second comparison part 34 performs the checksum a certain number of times.

Among the pairs of a certain IP address and the TCP/UDP port number, the second comparison part 34 reports, to the communication speed control part 32, the pair of the IP address and the TCP/UDP port number in which the checksums of the IP packets match sequentially as the IP packet that is transmitted form the mobile terminal 2.

Next, description will be made of a method for identifying the IP packet addressed to the mobile terminal 2 among the IP packets received from the network. The second comparison part 34 calculates the checksum for the IP packet flowing toward the external port 7F from the external port 7E (in a direction toward the BBR 4 from the communication control part 10). In the same way as described above, the second comparison part 34 calculates the checksum for the data except the IP/TCP/UDP header. The second comparison part 34 gives the calculation result to the first comparison part 14.

The first comparison part 14 calculates the checksum for the IP packet flowing toward the radio base station part 10 from the BBR4. Then the first comparison part 14 compares the calculated checksum to the checksum received from the second comparison part 34. Among the IP packets as a target of the checksum calculation in the second comparison part 34, the value of the checksum of the IP packet addressed to the mobile terminal 2 matches the value of the checksum to be obtained by the first comparison part 14. The first comparison part 14 performs the checksum a certain number of times. Among the pairs of the IP address and the TCP/UDP port number in which the checksums match sequentially, the comparison part 14 reports, to the communication speed control part 32, the pair of the IP address and the TCP/UDP port number in which the checksums match sequentially as the pair addressed to the mobile terminal 2.

If the mobile terminal 2 starts real-time communication such as the voice communication by the procedure (4), the femto BTS 1 recognizes the pair of the IP address and the TCP/UDP port number of the IP packet transmitted and received to and from the mobile terminal 2.

(5) While the mobile terminal 2 is maintaining voice communication, it is assumed that the PC 3 starts processing for e-mail transfer preparation via the femto BTS 1. The PC 3 is connected to a specific server (SMTP server, for example) on the Internet 62 via the broadband line. When the connection is completed, the PC 3 starts transferring mail data to the server.

(6) While the mail data of the PC 3 is being transferred, the measurement part 31 of the femto BTS 1 measures the data amount of the data flowing between the external port 7E and the external port 7F. The measurement is performed for each direction in which the data flows and each pair of the IP address and the TCP/UDP port number. The measurement part 31 reports the measurement result to the communication speed control part 32 (see FIG. 11B (c)).

By using the measurement result reported from the measurement part 31 and the information reported from the base station control part 13, the first comparison part 14, and the second comparison part 34 in the above-described procedure (3) and procedure (4), the communication speed control part 32 determines whether or not restraint of the communication of the PC 3 is required. As illustrated in FIG. 11B (c), the communication speed control part 32 does not restrain the communication of the PC 3 if the restraint condition is met. On the other hand, as illustrated in FIG. 11C (d) and FIG. 11C (e), if the restraint condition is not met, the communication speed control part 32 determines that the restraint of the PC 3 is required, and then starts restraining the communication of the PC 3. With reference to FIG. 12, the determination processing in the communication speed control part 32 will be described specifically.

FIG. 12 is a flowchart illustrating processing in the communication speed control part 32. The processing illustrated in FIG. 12 is performed in the communication speed control part 32 of the femto TBS 1 according to the present embodiment. Description will be made of a flow of the processing in the communication speed control part 32 of the femto BTS 1 where the mobile terminal 2 or the PC 3 performs the communication in the procedure illustrated in FIG. 11A and FIG. 11B.

In Operation 1, when receiving a band secure request from the base station control part 13, the communication speed control part 32 stores the bandwidth required by the mobile terminal 2 in the memory. Operation 1 corresponds to the above-described procedure (3).

In Operation 2, the communication speed control part 32 receives the pair (set_D) of the IP address and the TCP/UDP port number used by the mobile terminal 2 in the downward direction from the first comparison part 14 and stores the pair in the memory. In Operation 3, the communication speed control part 32 receives the pair (set_U) of the IP address and the TCP/UDP port number used by the mobile terminal 2 in the upward direction from the second comparison part 34 and stores the pair in the memory. Operation 2 and Operation 3 correspond to the procedure (4).

In Operation 4, the communication speed control part 32 receives, from the measurement part 31, the communication amount of the IP packet passing the measurement part 31 for each of the pairs of the IP address and the TCP/UDP port number. Operation 4 corresponds to the above-described procedure (6).

In Operation 5, as for the data in the downward direction, the communication speed control part 32 determines whether or not the flowing data that is equal to or larger than the restraint condition. If the communication speed in the downward direction is smaller than the restraint condition, the communication speed control part 32 does not perform processing. The process goes to Operation 7. On the other hand, in the determination in Operation 5, if the communication speed in the downward direction is equal to or larger than the restraint condition, the process goes to Operation 6.

In Operation 6, the communication speed control part 32 refers to the communication amount previously received from the measurement part 31 in Operation 4 and obtains the pair flowing the largest amount of data among the pairs except the pair (set_D) of the IP address and the TCP/UDP port number used by the mobile terminal 2. The communication speed control part 32 transmits an instruction to the restraint part 33 to restrain the communication with respect to the obtained pair. Operation 5 and Operation 6 correspond to the procedure (7) and the procedure (8) in FIG. 11C described below.

Regarding the data in the upward direction, the communication speed control part 32 determines whether or not the flowing data is equal to or larger than the restraint condition. If the communication speed in the upward direction is smaller than the restraint condition, the communication speed control part 32 does not perform processing. The process goes to Operation 4. On the other hand, in the determination in Operation 7, if the communication speed in the upward direction is equal to or larger than the restraint condition in the upward direction, the process goes to Operation 8.

In Operation 8, the communication speed control part 32 refers to the communication amount previously received from the measurement part 31 in Operation 4 and obtains the pair with the largest amount of data flowing among the pairs except the pair (set_U) of the IP address and the TCP/UDP port number used by the mobile terminal 2. The communication speed control part 32 transmits an instruction (a control signal) to the restraint part 33 to restrain the communication of the obtained pair.

The restraint part 33 restrains the communication of the PC 3 according to the control signal that is received from the communication speed control part 32 in Operation 6 or Operation 8. In the femto BTS 1 according to the present embodiment, the restraint part 33 restrains the communication by using the same method as used by the femto BTS 1 according to the above-described first embodiment.

For example, as illustrated in the procedure (7) and procedure (8) in FIG. 11C, there is a method for intentionally losing some packets to be transferred or for rewriting the value of the reception window size in a response (ACK) to be transmitted from the PC 3 into a smaller value. In the same way as in the first embodiment, a method for delaying timing of transfer of the ACK may be used.

Regarding the method for restraining the communication in the upward direction, in the same way as in the first embodiment, for example, a method for transmitting a Pause packet according to IEEE802.3x flow control specification may be used.

Regarding the femto BTS 1 according to the present embodiment, as with the femto BTS according to the above-described first embodiment, one mobile terminal 2 and one PC 3 may not be stored, respectively.

Even when each of the plurality of radio terminal equipment stored in the femto BTS 1 is performing voice communication or the like, the communication speed control part 32 may identify the IP packet transmitted and received to and from each radio terminal equipment by pair part of the IP address and the TCP/UDP port number. Consequently, the communication speed control part 32 may not restrain the IP packet transmitted and received to and from the radio terminal equipment if the communication speed of the data on the path between the external port 7F and the external port 7E is equal to or larger than the restraint condition.

If the femto BTS 1 has a plurality of terminal equipment such as the PC 3, the communication speed control part 32 may recognize the IP address and the TCP/UDP port number of the IP packet transmitted and received to and from the radio terminal equipment based on the information reported from the first comparison part 14 and the second comparison part 34. Therefore, the communication speed control part 32 refers to the pair of the IP address and the TCP/UDP port number if the total communication speed reported from the measurement part 31 is equal to or larger than the restraint condition. The IP packet other than the IP packet transmitted and received to and from the radio terminal equipment is a restraint target, and the restraint may be performed on the IP packet in order from the IP packet with a higher communication speed.

As described above, the femto BTS 1 according to the present embodiment, the BBR 4 is interposed between the femto BTS 1 and the optical network unit (ONU) 5. It is possible to identify the packet transmitted and received to and from the radio terminal equipment from the packet transmitted and received to and from other terminal equipment. Consequently, the femto BTS 1 according to the present embodiment restrains the communication of the terminal equipment other than the radio terminal equipment if the communication speed of the data on the communication path of the terminal equipment that includes the radio terminal equipment is equal to or larger than the given threshold value. Accordingly, the same efficiency as that from the femto BTS 1 according to the above described embodiment may be obtained.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication apparatus, comprising:
a memory for storing executable instructions; and
a processor that performs a method by executing the instructions stored in the memory, the method comprising:
a detecting process which detects a bandwidth used by a first terminal equipment which performs radio communication,
a communication speed measurement process which measures a communication speed of a second terminal equipment,
a control process which generates a control signal controlling a communication of the second terminal equipment based on a comparison of the detected bandwidth from the detecting process and the measured communication speed from the communication speed measurement process with a certain threshold value, and
a restraint process which restrains communication of the second terminal equipment according to the control signal generated by the control process.

2. The communication apparatus according to claim 1, wherein the comparison includes generating the control signal if the total bandwidth of a bandwidth detected by the detecting process and the bandwidth corresponding to a communication speed of the second terminal equipment measured by the communication speed measurement process is equal to or larger than a certain threshold value.

3. The communication apparatus according to claim 1, wherein the communication apparatus communicates with the first terminal equipment and the second terminal equipment and is connected to a router device which is connected to an Optical Network Unit.

4. The communication apparatus according to claim 1, wherein the communication speed measurement process measures a communication speed of data for each communication service used by the second terminal equipment, and
wherein the control process generates the control signal of communication restraint for each communication service used by the second terminal equipment if the communication speed measured by the communication speed measurement process is equal to or larger than the certain threshold value.

5. A communication apparatus comprising:
a memory for storing executable instructions; and
a processor that performs a method by executing the instructions stored in the memory, the method comprising:
a communication speed measurement process which measures a communication speed of data on a communication path where both data of a first terminal equipment which performs radio communication and data of a second terminal equipment pass through,
an identification process which identifies the data transmitted and received to and from the first terminal equipment or the data transmitted and received to and from the second terminal equipment,
a control process which generates a control signal which controls communication of the second terminal equipment by using an identification result from the identification process based upon the communication speed measured by the communication speed measurement process, and
a restraint process which restrains the communication of the second terminal equipment according to the control signal generated by the control process.

6. The communication apparatus according to claim 5, wherein the control process generates the control signal if the communication speed measured by the communication speed measurement process is equal to or larger than a certain threshold value.

7. The communication apparatus according to claim 5, wherein the communication apparatus is allocated between a router device which controls a route of data of the first terminal equipment and of the data of the second terminal equipment and an Optical Network Unit.

8. The communication apparatus according to claim 5, wherein the communication speed measurement process measures the communication speed of the data for each communication service used by a terminal equipment, and
wherein the control process generates a control signal of communication restraint for each communication service used by the terminal equipment if the communication speed measured by the communication speed measurement process is equal to or larger than the certain threshold value.

9. The communication apparatus according to claim 8, wherein the identification process comprises:
a first calculation process which calculates a checksum of the data transmitted and received to and from the first terminal equipment, and
a second calculation process which calculates a checksum of the data transmitted and received to and from the first terminal equipment and the second terminal equipment,
and wherein the second calculation process identifies the data transmitted and received to and from the first terminal equipment by comparing the checksum reported from the first calculation process to the calculated checksum,
and wherein the control process generates a control signal which restrains the communication of the second terminal equipment based on the report from the second calculation process.

10. The communication apparatus according to claim 8, wherein the identification process comprises:
a first calculation process which calculates the checksum of the data transmitted and received to and from the first terminal equipment, and
a second calculation process which calculates the checksum of the data transmitted and received to and from the first terminal equipment and the second terminal equipment,
and wherein the first calculation process identifies the data transmitted and received to and from the first terminal equipment by comparing the checksum reported from the second calculation process to the calculated checksum,
and wherein the control process generates a control signal used to restrain the communication of the second terminal equipment based on the report from the first calculation process.

11. The communication apparatus according to claim 4, wherein, according to the information reported from the control process, the restraint process restrains the communication of the second terminal equipment by performing flow control or data discard, delay of response transmission timing, or reduction of data size to be received for each service used by the terminal equipment.

12. A communication method for a communication apparatus, comprising:

detecting a bandwidth used by a first terminal equipment which performs radio communication, measuring a communication speed of a second terminal equipment, generating a control signal controlling a communication of the second terminal equipment based on a comparison of the detected bandwidth and the measured communication speed of the second terminal equipment with a certain threshold value, and restraining communication of the second terminal equipment according to the generated control signal generated.

13. A communication method for a communication apparatus comprising:

measuring a communication speed of data on a communication path where both data of a first terminal equipment which performs radio communication and data of a second terminal equipment pass through, identifying the data transmitted and received to and from the first terminal equipment or the data transmitted and received to and from the second terminal equipment, generating a control signal which controls communication of the second terminal equipment by using an identification result based upon the measured communication speed, of the second terminal equipment and restraining the communication of the second terminal equipment according to the generated control signal.

* * * * *